US012682587B2

(12) United States Patent
Liu

(10) Patent No.: US 12,682,587 B2
(45) Date of Patent: Jul. 14, 2026

(54) METHOD, DEVICE AND MEDIUM OF A FULL-AUTOMATIC CAPTURE FOR ROOM

(71) Applicant: Beijing Zitiao Network Technology Co., Ltd., Beijing (CN)

(72) Inventor: Ziyuan Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 161 days.

(21) Appl. No.: 18/797,265

(22) Filed: Aug. 7, 2024

(65) Prior Publication Data

US 2025/0054256 A1     Feb. 13, 2025

(30) Foreign Application Priority Data

Aug. 7, 2023   (CN) .......................... 202310988993.7

(51) Int. Cl.
*G06T 19/20*          (2011.01)
*G06F 3/04815*        (2022.01)
(Continued)

(52) U.S. Cl.
CPC .......... *G06T 19/20* (2013.01); *G06F 3/04815* (2013.01); *G06F 3/0484* (2013.01);
(Continued)

(58) Field of Classification Search
CPC   G06T 19/20; G06T 7/70; G06T 17/00; G06T 2207/10024; G06T 2207/20092;
(Continued)

(56) References Cited

U.S. PATENT DOCUMENTS

| | | | |
|---|---|---|---|
| 8,818,081 B1 * | 8/2014 | Lookingbill | ............ G06T 15/10 |
| | | | 382/154 |
| 2012/0194516 A1 * | 8/2012 | Newcombe | ............ G06T 17/00 |
| | | | 345/420 |

(Continued)

FOREIGN PATENT DOCUMENTS

| | | |
|---|---|---|
| CN | 108629830 A | 10/2018 |
| CN | 109064545 A | 12/2018 |
| CN | 114821055 A | 7/2022 |

OTHER PUBLICATIONS

Li, J., Gao, W., Wu, Y., Liu, Y., & Shen, Y. (2022). High-quality indoor scene 3D reconstruction with RGB-D cameras: A brief review. Computational Visual Media, 8(3), 369-393.*

(Continued)

*Primary Examiner* — Sarah Lhymn

(57)          ABSTRACT

Embodiments of the present disclosure provide a method, apparatus, device and medium of a full-automatic capture for a room, and the method comprises: acquiring an RGB image of a room to be captured, depth information of the RGB image and camera pose information and inputting them into a capture model to obtain capture information of an object in the RGB image, wherein the capture information of the object comprises a category of the object and position information of the object. A capture box of the object is displayed in a VST image of the room according to the capture information of the object, a 3D model of the object is added in a 3D model of the room, and the 3D model of the room is generated according to a pre-determined size ratio for the captured object in the room.

20 Claims, 8 Drawing Sheets

(51) Int. Cl.
  *G06F 3/0484*     (2022.01)
  *G06T 7/70*      (2017.01)
  *G06T 17/00*     (2006.01)
  *G06V 20/50*     (2022.01)

(52) U.S. Cl.
  CPC ............... *G06T 7/70* (2017.01); *G06T 17/00*
    (2013.01); *G06V 20/50* (2022.01); *G06T*
    *2207/10024* (2013.01); *G06T 2207/20092*
    (2013.01); *G06T 2207/30244* (2013.01); *G06T*
    *2219/2012* (2013.01); *G06T 2219/2016*
              (2013.01)

(58) Field of Classification Search
  CPC ... G06T 2207/30244; G06T 2219/2012; G06T
    2219/2016; G06T 2210/04; G06F
    3/04815; G06F 3/0484; G06F 3/04842;
      G06F 3/04845; G06V 20/50
  See application file for complete search history.

(56)       References Cited

U.S. PATENT DOCUMENTS

| | | | |
|---|---|---|---|
| 2015/0078621 A1* | 3/2015 | Choi ........................ | G06F 3/017 |
| | | | 382/103 |
| 2015/0294505 A1* | 10/2015 | Atsmon .............. | G06F 3/04815 |
| | | | 345/633 |
| 2016/0189384 A1* | 6/2016 | Meier ....................... | G06T 7/70 |
| | | | 382/103 |
| 2018/0336733 A1* | 11/2018 | Koga ........................ | G06T 7/60 |
| 2019/0164346 A1* | 5/2019 | Kim ....................... | G06T 15/005 |
| 2021/0092286 A1* | 3/2021 | Kolesov ................. | G06T 17/20 |
| 2023/0082420 A1* | 3/2023 | Yu ............................. | G06T 7/73 |
| | | | 345/619 |
| 2023/0244363 A1* | 8/2023 | Zhang ..................... | G06F 9/451 |
| | | | 715/764 |
| 2024/0135578 A1* | 4/2024 | Kim ......................... | G06T 7/90 |
| 2024/0169700 A1* | 5/2024 | Ebner ....................... | G06T 7/70 |
| 2024/0386655 A1* | 11/2024 | Peuhkurinen ........... | G06F 3/011 |

OTHER PUBLICATIONS

"Apple released the ARKit tool RoomPlan, which supports scanning and modeling 3D floor plans of rooms", Jun. 7, 2022, pp. 1-2.
"Apple WWDC22: RoomPlan uses LiDAR for 3D scan modeling of houses", Jun. 7, 2022, pp. 1-2.
Office action received from Chinese patent application No. 202310988993.7 mailed on Nov. 13, 2025, 15 pages (8 pages English Translation and 7 pages Original Copy).

* cited by examiner

ACQUIRE AN RGB IMAGE OF A ROOM TO BE CAPTURED, DEPTH INFORMATION OF THE RGB IMAGE AND CAMERA POSE INFORMATION — S201

INPUT THE RGB IMAGE, THE DEPTH INFORMATION OF THE RGB IMAGE, AND THE CAMERA POSE INFORMATION INTO A CAPTURE MODEL TO OBTAIN CAPTURE INFORMATION OF AN OBJECT IN THE RGB IMAGE, WHEREIN THE CAPTURE INFORMATION OF THE OBJECT COMPRISES A CATEGORY OF THE OBJECT AND POSITION INFORMATION OF THE OBJECT — S202

DISPLAY A CAPTURE BOX OF THE OBJECT IN THE VST IMAGE OF THE ROOM ACCORDING TO THE CAPTURE INFORMATION OF THE OBJECT, AND ADD A 3D MODEL OF THE OBJECT IN A 3D MODEL OF THE ROOM, WHEREIN THE 3D MODEL OF THE ROOM IS DISPLAYED IN THE VST IMAGE, THE 3D MODEL OF THE ROOM COMPRISES A 3D MODEL OF THE CAPTURED OBJECT IN THE ROOM, AND THE 3D MODEL OF THE ROOM IS GENERATED ACCORDING TO A PRE-DETERMINED SIZE RATIO FOR THE CAPTURED OBJECT IN THE ROOM — S203

FIG. 2

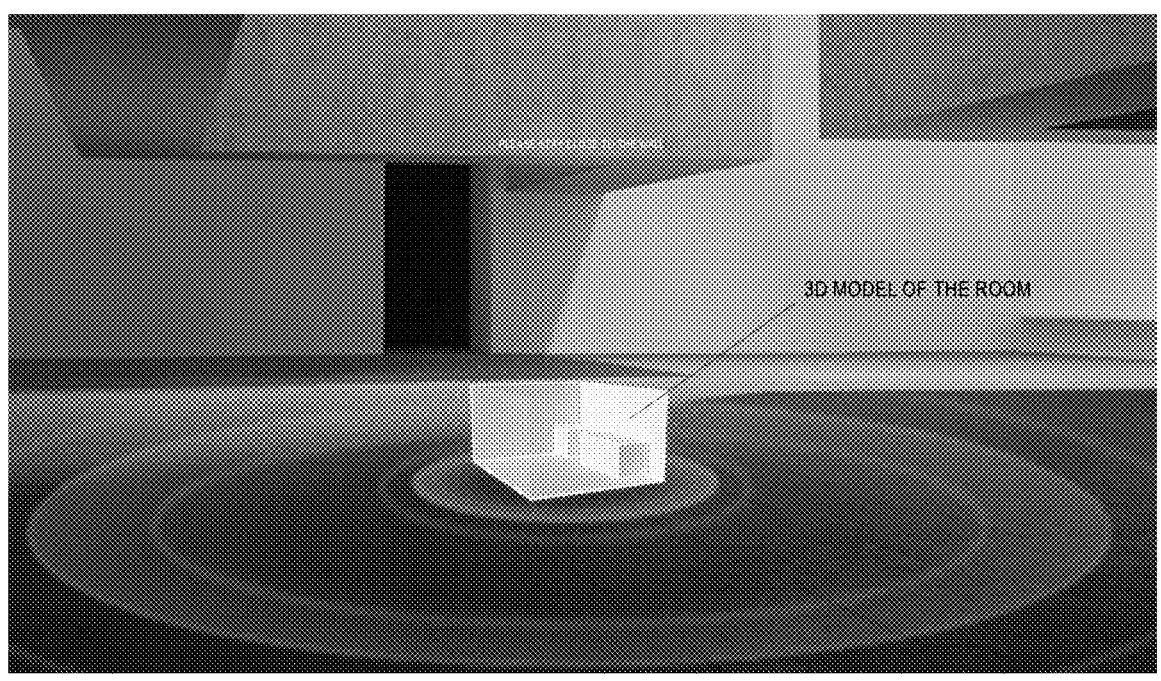

FIG. 3

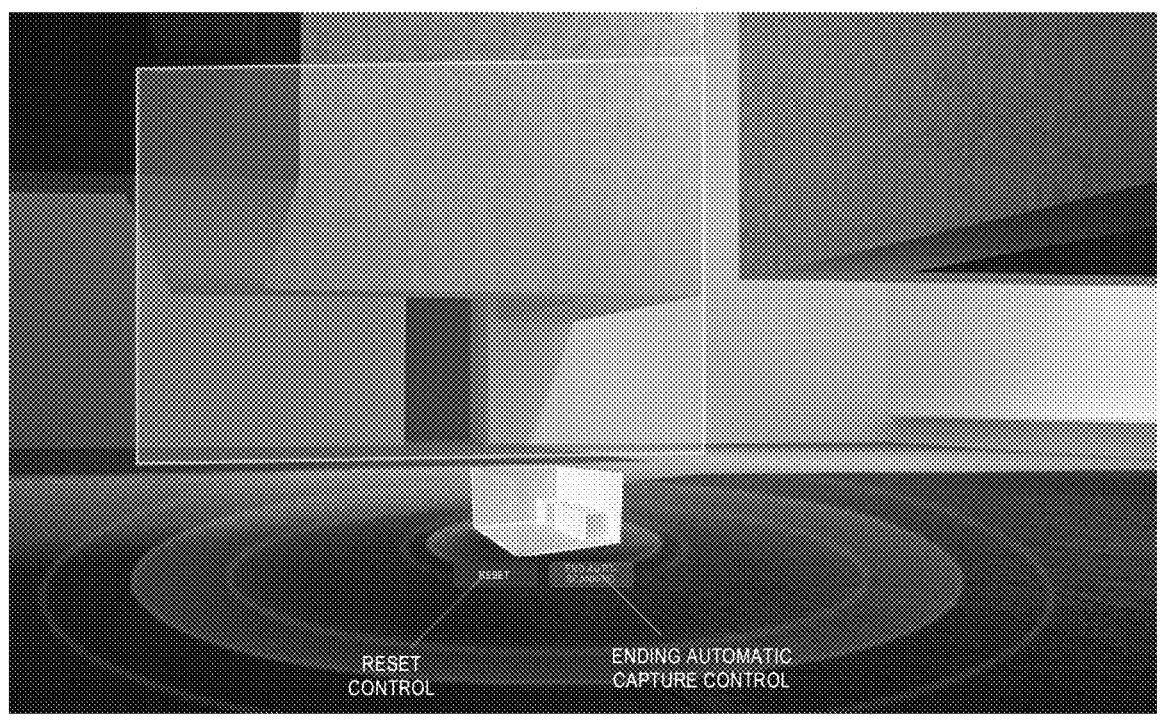

FIG. 9

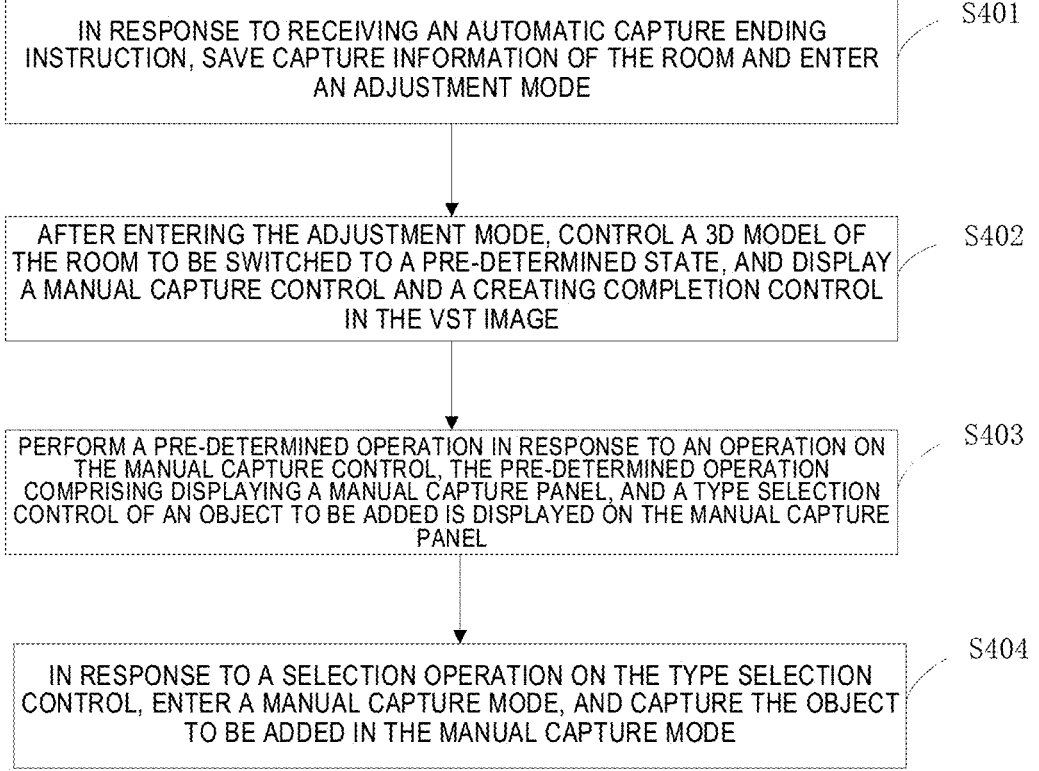

IN RESPONSE TO RECEIVING AN AUTOMATIC CAPTURE ENDING INSTRUCTION, SAVE CAPTURE INFORMATION OF THE ROOM AND ENTER AN ADJUSTMENT MODE — S401

AFTER ENTERING THE ADJUSTMENT MODE, CONTROL A 3D MODEL OF THE ROOM TO BE SWITCHED TO A PRE-DETERMINED STATE, AND DISPLAY A MANUAL CAPTURE CONTROL AND A CREATING COMPLETION CONTROL IN THE VST IMAGE — S402

PERFORM A PRE-DETERMINED OPERATION IN RESPONSE TO AN OPERATION ON THE MANUAL CAPTURE CONTROL, THE PRE-DETERMINED OPERATION COMPRISING DISPLAYING A MANUAL CAPTURE PANEL, AND A TYPE SELECTION CONTROL OF AN OBJECT TO BE ADDED IS DISPLAYED ON THE MANUAL CAPTURE PANEL — S403

IN RESPONSE TO A SELECTION OPERATION ON THE TYPE SELECTION CONTROL, ENTER A MANUAL CAPTURE MODE, AND CAPTURE THE OBJECT TO BE ADDED IN THE MANUAL CAPTURE MODE — S404

FIG. 10

METHOD, DEVICE AND MEDIUM OF A FULL-AUTOMATIC CAPTURE FOR ROOM

CROSS-REFERENCE TO RELATED APPLICATIONS

The present application claims priority to Chinese Patent Application No. 202310988993.7, filed on Aug. 7, 2023, entitled "METHOD, APPARATUS, DEVICE, MEDIUM AND PROGRAM PRODUCT OF A FULL-AUTOMATIC CAPTURE FOR A ROOM", which is hereby incorporated by reference in its entirety.

FIELD

Embodiments of the present application relates to the field of virtual reality, in particular to a method, device and medium of a full-automatic capture for a room.

BACKGROUND

Extended reality (XR) refers to a virtual environment for providing human-machine interactions by combining reality and virtuality through a computer, and also is a collective term of a variety of technologies such as virtual reality (VR), augmented reality (AR), and mixed reality (MR). By fusing three visual interaction techniques, an immersive felling of a seamless transition between a virtual world and an actual world is brought to an experiencer.

In an MR scenario, positions of objects such as the ground, wall surfaces, ceilings, pieces of furniture and the like in a room are sequentially captured by using a room capture mode, and some gameplays may be derived in an MR space based on the capture technology. For example, a virtual sphere is used to be ejected onto a real space to collide back. In the existing capture mode, the user needs to manually perform a capture, the capture efficiency is low, and the capture result is inaccurate.

SUMMARY

An embodiment of the present application provides a method, apparatus, device, medium, and program product of a full-automatic capture for a room, that can automatically accomplish a capture of a room according to images acquired by a camera, improve the capture efficiency and accuracy, and can generate and display a three-dimensional, 3D, model of a captured object in real time according to capture information of the captured object in a capture process, so that a user can know the capture progress of the room, thus bringing a better capture experience to the user.

In a first aspect, an embodiment of the present application provides a full-automatic capture method for a room, comprising: acquiring a red-green-blue, RGB, image of a room to be captured, depth information of the RGB image, and camera pose information; inputting the RGB image, the depth information of the RGB image, and the camera pose information into a capture model to obtain capture information of an object in the RGB image, wherein the capture information of the object comprises a category of the object and position information of the object; and displaying a capture box of the object in a video see-through, VST, image of the room according to the capture information of the object, and adding a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

In some embodiments, category information of the captured object is displayed at a pre-determined position of the capture box of the captured object.

In some embodiments, a color of the capture box of the captured object and a color of the 3D model of the captured object are associated with the category of the captured object, and the color of the capture box of the captured object is the same as the color of the 3D model of the captured object.

In some embodiments, a model display area is arranged in the VST image, and the 3D model of the room is displayed in the model display area.

In some embodiments, the method further comprises: playing a first dynamic effect in the model display area before starting to capture the room to display a 3D model of a first object in the room; and stopping playing the first dynamic effect based on the 3D model of the first object being displayed.

In some embodiments, the displaying a capture box of the object in a video see-through, VST, image of the room according to the capture information of the object, and adding a three-dimensional, 3D, model of the object in a 3D model of the room comprises: sequentially displaying, on a surface of the object displayed in the VST image and according to the position information of the object, the capture box of the object formed by capture lines; determining a position and a size of the 3D model of the object according to the position information of the object; and growing the 3D model of the object in the 3D model of the room based on a pre-determined growth rule according to the position and the size of the 3D model of the object, wherein the growth rule comprises a growth direction.

In some embodiments, the method further comprises: in response to receiving an automatic capture ending instruction, saving the capture information of the room and entering an adjustment mode; and after entering the adjustment mode, controlling the 3D model of the room to be switched to a pre-determined state, and displaying a manual capture control and a creating completion control in the VST image, wherein the manual capture control is used to trigger a manual capture process, and the creating completion control is used to confirm an end of an adjustment process of the capture information of the room.

In some embodiments, the controlling the 3D model of the room to be switched to a pre-determined state comprises: amplifying the 3D model to a pre-determined size; and/or adjusting a display position of the 3D model of the room.

In some embodiments, if category information of the captured object is not displayed in the capture process and/or the capture box of the captured object is not filled with a color, after entering the adjustment mode, the method further comprises: displaying the category information of the captured object at a pre-determined position of the capture box of the captured object; and/or filling the capture box of the captured object with the color according to the category information of the captured object.

In some embodiments, the method further comprises: displaying an editing control and a deleting control in response to a first operation on the capture box of the first captured object or the category information of the first captured object; modifying the category information of the first captured object in response to an operation on the editing control; or deleting the capture information, the 3D model and the capture box of the first captured object in response to an operation on the deleting control.

In some embodiments, the method further comprises: performing a pre-determined operation in response to an operation on the manual capture control, wherein the pre-determined operation comprises displaying a manual capture panel, and a type selection control of an object to be added is displayed on the manual capture panel; and in response to a selection operation on the type selection control, entering a manual capture mode, and capturing the object to be added in the manual capture mode.

In some embodiments, the pre-determined operation comprises hiding the 3D model of the room and/or hiding the category information of the captured object.

The capturing the object to be added in the manual capture mode comprises: hiding the manual capture panel; displaying a capture prompt panel, in which a manually captured presentation video is played; and accomplishing a capture of the object to be added according to a capture operation of a user.

In some embodiments, the method further comprises: in response to detecting a second operation on the 3D model of the room, controlling the 3D model of the room to enter an editing state, and displaying a pre-determined special effect on the 3D model of the room after the 3D model of the room enters the editing state; and controlling the 3D model of the room to rotate in response to detecting a rotation instruction.

In some embodiments, the 3D model of the room is movable in a field of view of a user, and the method further comprises: in accordance with a determination that a rotation angle of a head mount device is greater than a pre-determined angle or the 3D model of the room moves out of the field of view of the user, controlling the 3D model of the room to move to a pre-determined position in the field of view of the user according to a position of the head mount device.

In some embodiments, the 3D model of the room is rotatable in a field of view of a user, and the method further comprises: based on that a rotation of a head mount device in a horizontal direction is detected, the 3D model of the room follows the head mount device to rotate in the horizontal direction, and based on that a rotation of a head mount device in a vertical direction is detected, the 3D model of the room does not rotate.

In some embodiments, the capture model comprises a room layout model and a 3D object detection model.

The room layout model is used for detecting walls, floors, ceilings, and doors and windows in the room.

The 3D object detection model is used for detecting pieces of furniture in the room.

In some embodiments, the method further comprises: displaying prompt information corresponding to an abnormal event in the VST image in response to detecting the abnormal event; and closing the prompt information corresponding to the abnormal event in response to detecting a disappearance of the abnormal event, wherein the prompt information corresponding to the abnormal event is used to prompt the following: a movement of a user in a room, the user being moving too fast, a distance between the user and a wall being too far, the user being too close to the object, or an ambient light of the room is too dark.

In a second aspect, an embodiment of the present application provides a full-automatic capture apparatus for a room, comprising: an acquiring module configured to acquire a red-green-blue, RGB, image of a room to be captured, depth information of the RGB image, and camera pose information; a capturing module configured to input the RGB image, the depth information of the RGB image, and the camera pose information into a capture model to obtain capture information of an object in the RGB image, wherein the capture information of the object comprises a category of the object and position information of the object; and a displaying module configured to display a capture box of the object in a video see-through, VST, image of the room according to the capture information of the object, and add a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

In a third aspect, an embodiment of the present application provides an XR device, comprising: a processor and a memory, wherein the memory is configured to store a computer program, and the processor is configured to invoke and run the computer program stored in the memory to perform the method of the first aspect.

In a fourth aspect, an embodiment of the present application provides a computer-readable storage medium configured to store a computer program, that causes a computer to perform the method of the first aspect.

In a fifth aspect, an embodiment of the present application provides a computer program produce comprising a computer program, that when executed by a processor, implements the method of the first aspect.

The present application provides a full-automatic capture method and apparatus for a room, a device, a medium, and a program product, and the method comprises: acquiring an RGB image of a room to be captured, depth information of the RGB image, and camera pose information and inputting them into a capture model to obtain capture information of an object in the RGB image, wherein the capture information of the object comprises a category of the object and position information of the object. A capture box of the object is displayed in a VST image of the room according to the capture information of the object, a 3D model of the object is added in a 3D model of the room, and the 3D model of the room is generated according to a pre-determined size ratio for the captured object in the room. According to the method, a capture of the room can be automatically accomplished according to images acquired by a camera, the capture efficiency and accuracy are improved, and in the capture process, the 3D model of the captured object can be generated and displayed in real time according to the capture information of the object, so that the user can know the capture progress of the room, thus bringing a better capture experience to the user.

BRIEF DESCRIPTION OF THE DRAWINGS

In order to more clearly illustrate the technical solutions in the embodiments of the invention, the accompanying drawings to be used in the description of the embodiments will be briefly introduced below. It is apparent that the drawings in the following description are merely some embodiments of the invention, and for those of ordinary skill in the art, other drawings may be obtained according to these drawings without creative efforts.

FIG. 2 is a flowchart of a full-automatic capture method according to an embodiment 1 of the present application;

FIG. 3 is a schematic diagram of an extended reality space in a capture process;

FIG. 9 is a schematic diagram of a display of an extended reality space after receiving an automatic capture ending instruction;

FIG. 10 is a flowchart of a full-automatic capture method for a room according to an embodiment 3 of the present application;

DETAILED DESCRIPTION

Figure 1:
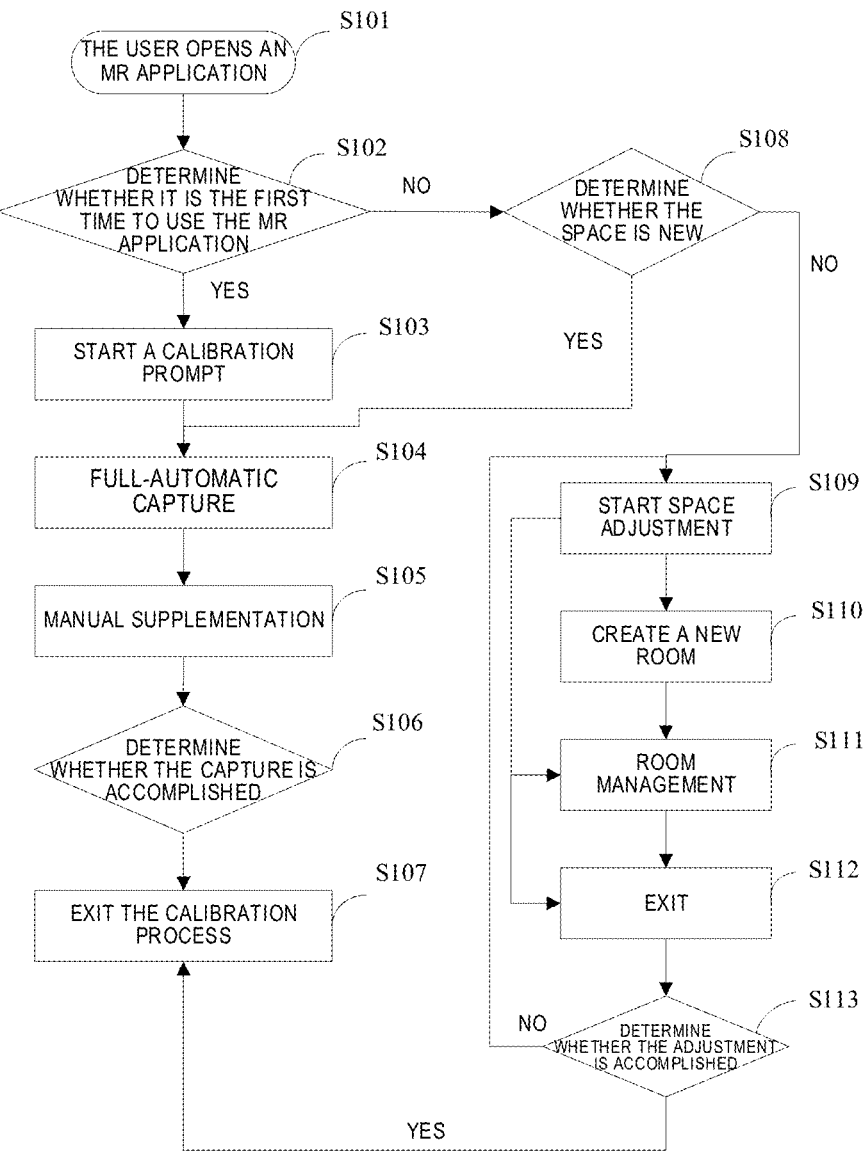
FIG. 1 is a schematic flowchart from starting an MR application to an end of capture according to the present application.

The technical solutions in the embodiments of the invention will be clearly and completely described below in conjunction with the accompanying drawings in the embodiments of the invention, and it is obvious that the described embodiments are merely a part of the embodiments of the invention, but not all embodiments. Based on the embodiments of the invention, all other embodiments obtained by those of ordinary skill in the art without creative efforts shall fall within the scope of the invention.

It should be noted that the terms "first", "second", and the like in the specification and claims of the invention and the foregoing drawings are used to distinguish similar objects, and are not necessarily used to describe a specific order or sequence. It should be understood that such data used may be interchanged where appropriate, so that the embodiments of the invention described herein can be implemented in an order other than those illustrated or described herein. Moreover, the terms "comprising," "having," and any variants thereof are intended to cover a non-exclusive inclusion. For example, a process, method, system, product, or server containing a series of steps or units is not necessarily limited to those steps or units expressly listed, but may include other steps or units not expressly listed or inherent to such processes, methods, products, or devices.

For case of understanding of the embodiments of the present application, before describing the embodiments of the present application, some concepts involved in all embodiments of the present application are appropriately explained first, and are specifically as follows.

A multi-room capture method provided in an embodiment of the present application may be applied in an XR device, and the XR device includes, but is not limited to, a VR device, an AR device, and an MR device.

VR: a technology for creating and experiencing a virtual world, calculates and generates a virtual environment, and is multi-source informative (the virtual reality mentioned herein includes at least visual perception, and may also include auditory perception, tactile perception, motion perception, and even further include taste perception, olfactory perception, etc.), thereby implementing the simulation of a fused, interactive three-dimensional dynamic visual and physical behaviors of the virtual environment, enabling a user to be immersed into a simulated virtual reality environment, and implementing an application of a plurality of virtual environments such as maps, games, videos, education, medical treatments, simulation, collaborative trainings, sales, assisted manufacturing, maintenance, and repair.

AR: an AR scene refers to a simulated scene in which at least one virtual object is superimposed over a physical scene or a representation thereof. For example, an electronic system may have an opaque display and at least one imaging sensor for capturing images or videos of the physical scene, which are representations of the physical scene. The system combines the images or videos with the virtual object and displays the combination on the opaque display. An individual uses the system to indirectly view the physical scene via the images or videos of the physical scene, and observe the virtual object superimposed over the physical scene. When the system captures the images of the physical scene using one or more image sensors, and uses those images to present the AR scene on the opaque display, the displayed images are referred to as video see-through. Alternatively, the electronic system for displaying the AR scene may have a transparent or translucent display through which the individual may directly view the physical scene. The system may display the virtual object on the transparent or translucent display, such that the individual uses the system to observe the virtual object superimposed over the physical scene. For another example, the system may include a projection system that projects the virtual object into the physical scene. The virtual object may be projected, for example, on or as a hologram, such that the individual uses the system to observe the virtual object superimposed over the physical scene. Specifically, in the process of acquiring the images by a camera, a camera pose parameter of the camera in an actual world (or referred to as a three-dimensional world and a real world) is calculated in real time, and a virtual element technology is added on the images acquired by a camera according to the camera pose parameter. Virtual elements include, but are not limited to: images, videos, and three-dimensional models. An objective of the AR technology is to attach the virtual world onto the actual world on a screen for interaction.

MR: By presenting virtual scene information in a real scene, an information loop for interactive feedback is established between the real world, the virtual world and the user, so as to enhance the reality of user experience. For example, a computer-generated sensory input (e.g., the virtual object) is integrated with sensory inputs from the physical scene or representation thereof in the simulated scene, and in some MR scenes, the computer-generated sensory input may be adapted to changes in the sensory inputs from the physical scene. Additionally, some electronic systems for presenting the MR scenes may monitor orientations and/or positions relative to the physical scene to enable the virtual object to interact with real objects (i.e., physical elements from the physical scene or representations thereof). For example, the system may monitor motion such that virtual plants appear stationary relative to physical buildings.

A virtual reality device refers to a terminal that achieves a virtual reality effect, and generally may be provided as forms like a pair of glasses, a head mount display (HMD for short), and a contact lens, so as to realize visual perception and other forms of perception. Of course, the forms of the virtual reality device are not limited thereto, and may be further miniaturized or maximized according to actual needs.

Optionally, the virtual reality device (that is, the XR device) recited in the embodiments of the present application may include, but is not limited to, the following several types.

1) A mobile virtual reality device that supports setting a mobile terminal (such as a smart phone) in various manners (for example, a head mount display provided with a special card slot), performing related calculation of virtual reality functions by the mobile terminal by connecting wiredly or wirelessly with the mobile terminal, and outputting data to the mobile virtual reality device, for example, viewing a virtual reality video through an APP of the mobile terminal.

2) An integrated machine virtual reality device that is provided with a processor for performing related calculation of virtual functions, so that the integrated machine virtual reality device has independent virtual reality input and output functions, does not need to be connected with a personal computer (PC) or the mobile terminal, and is high in the degree of freedom of use.

3) A PC virtual reality (PCVR) device that uses the PC to perform related calculation and data output of the virtual reality functions, and an external PC virtual reality device uses data output by the PC to achieve an effect of the virtual reality.

The full-automatic capture method provided in the embodiments of the present application may be applied in an MR scenario, where an MR application (app) uses a room capture mode to assign a physical attribute (including but not limited to occlusion and collision) to a ground, a wall, a ceiling, and a piece of furniture in a space (or referred to as a room), and meanwhile, a spatial anchor technology is used to set an anchor point in an environment map corresponding to an actual environment. The MR application invokes the capture result of the space, and shows the content of the MR application to the user.

The XR device has a video see-through, VST, function. The VST technology acquires a real-time view of the surrounding environment through a camera of the head mount device (that is, the XR device), and then combines with the computer technology and is presented on the opaque display, so that human eyes can directly see the surrounding real world through the head mount device, and therefore also called a see-through function, which improves the perception of the surrounding environment by the user.

The MR application performs a space capture through the VST technology, the user can see the capture process and result in real time, and thus the interactivity of the user is enhanced. At present, the spatial capture is performed by using a way of ray capture, which refers to performing the capture through a virtual ray emitted by a virtual controller, where the user moves an end point of the virtual ray in the perspective image to a position of the object to be captured through a handle, and the virtual ray is controlled to move to form a capture box corresponding to the object. In general, each capture box is a rectangular capture box or a cubic capture box. By taking the capture of a table in the space as an example, the capture box is a rectangular capture box, the user needs to control the virtual ray to first capture three points on a bottom surface of the table to form a rectangular box, and a height of the table is captured, that is, the virtual ray is controlled to pull upwards to form a cube.

In the existing capture scheme, the user needs to manually perform a capture, the capture efficiency is low, and the capture result is inaccurate. In order to solve the problems in the prior art, an embodiment of the present application provides a full-automatic capture method through which a room capture is automatically accomplished by scanning a room to be captured through a camera of an XR device to obtain an image of the room, namely automatically identifying an object in the room and determining a position of the object in the room, and not needing the user to manually determine the position of the object.

FIG. 1 is a schematic flowchart from starting an MR application to an end of capture according to the present application. As shown in FIG. 1, the method provided in the embodiment comprises the following steps.

At S101, the user opens an MR application.

At S102, it is determined whether the MR application is used for the first time.

If so, step S103 is performed, and if not, step S108 is performed.

At S103, a capture prompt is started.

When the user uses the MR application for the first time, the user may not know the room capture process, therefore, the capture prompt is provided. The capture prompt is used to prompt the user which capture modes are present and how to perform the capture, and so on.

For example, the MR application can provide two capture modes of manual capture and full-automatic capture, a specific capture process of the two capture modes can be displayed to the user by a way of video demonstration, and the user can be helped to know and familiarize the capture process.

At S104, the full-automatic capture is performed.

After the capture prompt is accomplished, a full-automatic capture process is entered. The specific process of full-automatic capture is described with reference to the specific description of the following embodiments of the present application, and details are not described herein again.

At S105, a manual supplementation is performed.

Optionally, in the embodiment of the present application, after the full-automatic capture is accomplished, a manual supplement function is further provided, so as to correct result of the full-automatic capture, for example, to add an object which is ignored without being captured, and modify the position or category of the object that is inaccurate in capture.

At S106, it is determined whether the capture is accomplished.

Whether the capture is accomplished may be determined according to an operation of the user on a capture completion control on the capture page, and if the capture is accomplished, step S107 is performed, and if not, step S102 is performed.

At S107, the capture process exits.

At S108, it is determined whether there is a new space.

The XR device matches feature points of the current actual environment taken by the camera with feature points of the environment in the captured space. If the matching succeeds, it indicates that the current environment is not a new space, and if the matching fails, it indicates that the current environment is a new space. If the current space is a new space, step S104 is performed, and if the current space is not a new space, step S109 is performed.

At S109, space adjustment starts.

If the current space is not a new space, the existing space may be adjusted.

At S110, a new room is created.

At S111, room management is performed.

At S112, Exit.

At S113, it is determined whether the adjustment is accomplished.

After the space adjustment is started, one or more of steps S110-S112 may be performed according to adjustment requirements of the user. For example, if the user select not to adjust, S112 is performed, or if the user selects the room management, S111 is performed, and the room is deleted or modified.

If the adjustment is accomplished, step S107 is performed, and if the adjustment is not accomplished, the user may continue to adjust the room.

FIG. 2 is a flowchart of a full-automatic capture method according to an embodiment 1 of the present application, which is used to describe step S104 in FIG. 1 in detail. The method is applied in an XR device, which is also referred to as a head mount device. As shown in FIG. 2, the method provided in the embodiment includes the following steps.

At S201, an RGB image of a room to be captured, depth information of the RGB image, and camera pose information are acquired.

After the user selects the full-automatic capture on the XR device, the user wears the head mount device to move and/or rotate in the room to be captured, and takes a red (R), green (G), blue (B) image of the room through a camera (also referred to as a camera) on the head mount device, and acquires depth information of the RGB image. The depth information of each pixel in the RGB image is also referred to as a depth value. The depth value of the pixel is used to represent a distance between the pixel and the camera, and the depth value of each pixel in the RGB image constitutes a depth image.

Exemplarily, a depth camera may be used to take an image, and each pixel in the image taken by the depth camera is composed of four values, that is, (R, G, B, D), where RGB is values of three color channels of red (R), green (G), and blue (B), D is a depth value of the pixel, and the depth value of each pixel may be directly acquired from the image to form a depth map. The depth camera includes, but is not limited to, one or more of: a structured light apparatus, a binocular camera, a monocular camera, a Time of Flight (TOF) sensor.

The camera pose information refers to rotation and translation information of the camera relative to the world coordinate system when the camera takes the RGB image. The rotation and translation information may be represented by a matrix, so the camera pose information may be a rotation and translation matrix of the camera relative to the world coordinate system.

At S202, the RGB image, the depth information of the RGB image, and the camera pose information are input into a capture model to obtain capture information of an object in the RGB image, wherein the capture information of the object comprises a category of the object and position information of the object.

The capture model can output the category and position of the object in the image according to the RGB image. The category of the object is also referred to as semantic information of the object, that is, an attribute of the object that can be understood by the user. The position information of the object includes 3D coordinates of the object, and the 3D coordinates of the object may include 3D coordinates of each vertex of capture box of the object. When the capture box of the object is a rectangular box of 2D, the 3D coordinates of the object refer to 3D coordinates of 4 vertices of the rectangular box, where the capture boxes of objects such as the ground, the wall, or the like are 3D rectangular boxes. When the capture box of the object is a cuboid of 3D, the 3D coordinates of the object refer to 3D coordinates of 8 vertices of the cuboid, where the capture boxes of pieces of furniture such as a table, a chair, or the like may be a cuboid.

According to the coordinates of each vertex of the capture box, a size of the capture box may also be obtained, and the size of the capture box is also the size of the object. Therefore, the position information of the object may further include the size of the object, or the size of the object may be determined according to the position information of the object. It can be understood that the capture box of the object is not limited to a rectangle and a cuboid, or may also be a square, a cube, or the like, just to name a few.

The capture model may include one or more neural network models. The neural network model includes, but is not limited to, a Deep Neural Network (DNN) model, a Recurrent Neural Network (RNN) model, and the like. The training of the capture model can be accomplished through a large number of machine learning.

Exemplarily, the capture model includes a room layout model (layout model) and a 3D object detection model (3DOD). The room layout model is used for detecting walls, floors, ceilings, and doors and windows in a room.

The 3D object detection model is used for detecting pieces of furniture in the room, and the 3D object detection model may detect a large number of furniture types, including a table, a chair, a cabinet, a bed, a sofa and other furniture.

Exemplarily, the capture model may detect 34 types of objects, including but not limited to a ceiling, a wall, a floor, a door, a window, a beam, a pillar, a curtain, a table, a chair, a cabinet, a bed, a sofa, a plant, a screen/television (including a display), a person, a cupboard, a refrigerator, a shelf, a gas stove, a sink, a washing machine, a table lamp, a toilet, a bathtub, an oven, a dishwasher, a fireplace, a light, a stair, a radiator, an air conditioner, a picture, or the like.

At S203, a capture box of the object is displayed in the VST image of the room according to the capture information of the object, and a 3D model of the object is added in the 3D model of the room, wherein the 3D model of the room is displayed in the VST image, the 3D model of the room comprises a 3D model of the captured object in the room, and the 3D model of the room is generated according to a pre-determined size ratio for the captured object in the room.

The VST image of the room is generated according to the RGB image and the depth information, and the VST image is a 3D image. It can be understood that the VST image of the room is constantly changing. When the head mount device moves or rotates, the RGB image acquired by the camera changes, and correspondingly, the VST image of the room also changes.

In an implementation, the size of the capture box of the object and the position of the capture box in the VST image may be determined according to the position information of the object, and the capture box of the object is displayed in the VST image according to the size and the position of the capture box of the object. The position and the size of the 3D model of the object are determined according to the position information of the object, and the 3D model of the object is added in the 3D model of the room according to the position and the size of the 3D model of the object.

Optionally, the size and the position of the 3D model of the object may also be determined according to the size (equivalent to the size of the object) and position of the capture box of the object.

The 3D model of the room may be understood as an electronic sand table model of the room, and is generated in a pre-determined size ratio according to the actual layout of the room. The size ratio refers to a ratio relationship between the size of the 3D model of the object and the size of the capture box of the object. For example, the size ratio is, for example, 1:1000.

In the embodiment, the 3D model of the room is not generated once according to a complete capture result of the room, but the 3D model of the object in the room is gradually generated according to the capture progress of the room. The 3D model of the room displayed in real time in the VST image includes the 3D model of the captured object in the room, and for an uncaptured object in the room, the 3D model of the uncaptured object is not displayed in the 3D model of the room.

The XR device generates the 3D model of the object according to the size of the capture box of object and the pre-determined size ratio. The XR device not only needs to determine the size of the 3D model of the object, but also needs to determine the position of the 3D model of the object in the 3D model of the room, wherein the position of the 3D model of the object in the 3D model of the room is consistent with the position of the object in the room. That is, a relative position relationship between the 3D model of each object in the 3D model of the room is the same as the relative position relationship of the objects in the room.

Exemplarily, the capture box of the object may be displayed in the VST image and the 3D model of the object may be added in the 3D model of the room, in the following two manners.

Manner 1: According to the position information of the object, capture lines are sequentially displayed on a surface of the object displayed in the VST image to form the capture box of the object. The 3D model of the object is grown in the 3D model of the room based on a pre-determined growth rule according to the position and the size of the 3D model of the object, and the growth rule comprises a growth direction.

When capture lines are sequentially displayed on a surface of the object to form the capture box of the object, the capture lines may be displayed in a pre-determined display order. For example, when the capture box is a rectangular box, the capture lines of an upper surface of the object is displayed first, the capture lines on the left and right sides of the object are displayed at the same time, and finally the capture lines of a lower surface of the object is displayed. When the capture box is a cuboid, the capture lines of the lower surface may be displayed first, then the capture lines of the side surfaces are displayed from bottom to top, and finally the capture lines of the upper surface are displayed.

When the 3D model of the object is grown in the 3D model of the room, the model may be grown according to a pre-determined growth direction, for example, from left to right, from top to bottom, from bottom to top, and so on. Optionally, the growth rule may further include a growth order of the capture lines, and the growth order may be understood as a display order.

In this manner, the capture box and the 3D model of the object are displayed in a fading-in mode, wherein the fading-in refers to that the capture box and the 3D model of the object are slowly presented in the process of no display to all, the user can visually see a process in which the capture box and the 3D model of the object start from scratch, thus bringing a better visual experience to the user.

Manner 2: The capture box of the object is instantaneously displayed on the surface of the object displayed in the VST image according to the position information of the object. The 3D model of the object is instantaneously displayed in the 3D model of the room according to the position and the size of the 3D model of the object.

In this way, with respect to the first manner, the process in which the capture box and the 3D model of the object start from scratch is very fast in speed, and the user cannot perceive the process in which the capture box and the 3D model of the object start from scratch.

Manner 3: According to the position information of the object, the capture box of the object moves from the first position of an edge of the user perspective to the surfaces of the object in the VST image, and moves into the model of the room at the second position of the edge of the user perspective according to the position and the size of the model of the object.

The first position and the second position may be the same or different, which is not limited in the embodiments of the present application. According to the manner, the capture box and the 3D model of the object are displayed by a dynamic effect, thus bringing a better visual experience to the user.

In the embodiment, the 3D model of the object is added in the 3D model of the room according to the size and the position of the 3D model of the object, and in terms of user's visual effects, this is equivalent to the 3D model of a new object being grown in the 3D model of the room. The display of the 3D model of the object in the room is displayed according to the capture progress of the object in the room, and when the capture of one object is done, the 3D model of the object is displayed in the 3D model of the room in real time, so that the user can know the capture progress of the room, thus bringing a better capture experience to the user.

The capture box of the object is highlighted, and the capture box is superimposed and displayed in real time over a structure of the object in the VST image, which is equivalent to surrounding the object. Due to the influence of capture precision, the capture box may be slightly larger than, equal to or slightly smaller than the object in the VST image.

The capture box of the object is also referred to as a space shader, the display of the capture box meets the following requirements: a display structure of the wire frame, and has a depth relationship. It can be understood that if the distance of the object in the actual environment is different, the depth information of the object in the 3D space is different, so a depth of the capture box of the object needs to be determined according to a depth of the object, and the capture box of the object is displayed in the 3D space according to the depth of the capture box of each object.

Optionally, the display of the capture box further satisfies the following requirements: the color of the capture box can distinguish the category of the object. That is, the color of the capture box of the captured object, the color of the 3D model of the captured object are associated with the category of the captured object, and the color of the capture box of the captured object is the same as the color of the 3D model of the captured object. Different types of objects have different colors, for example, a table, a chair and a sofa use a green color, a ceiling, a wall and a ground use a yellow color, and the television and the air conditioner use a blue color.

Correspondingly, when the capture box of the object is displayed, the color of the capture box of the object is determined according to a correspondence between the predefined category of the object and the display color of the capture box.

FIG. 3 is a schematic diagram of an extended reality space in a capture process. As shown in FIG. 3, an extended reality space seen by a user through an actual screen of a head mount device includes a VST image of a room, a 3D model of the room displayed in a superimposed manner in the VST image of the room, and prompt information. It can be understood that FIG. 3 is a partial schematic diagram of the extended reality space, a capture box of an object is further displayed in the extended reality space, and the capture box is superimposed and displayed on a surface of the captured object and is attached to the object.

Optionally, category information of a captured object is displayed at a pre-determined position of the capture box of the captured object, and the category of the identified object is displayed in real time in the 3D space, so that the user knows the identified object in real time and causes the category of the object to corresponds to the object, thus bringing a better experience to the user.

The category information may be a category name such as a "table", a "chair" "couch", or the like. The pre-determined position may be above, on the right or left of the captured object, which is not limited in the embodiment. The category information of the object may be displayed in a prompt box.

Figure 4:
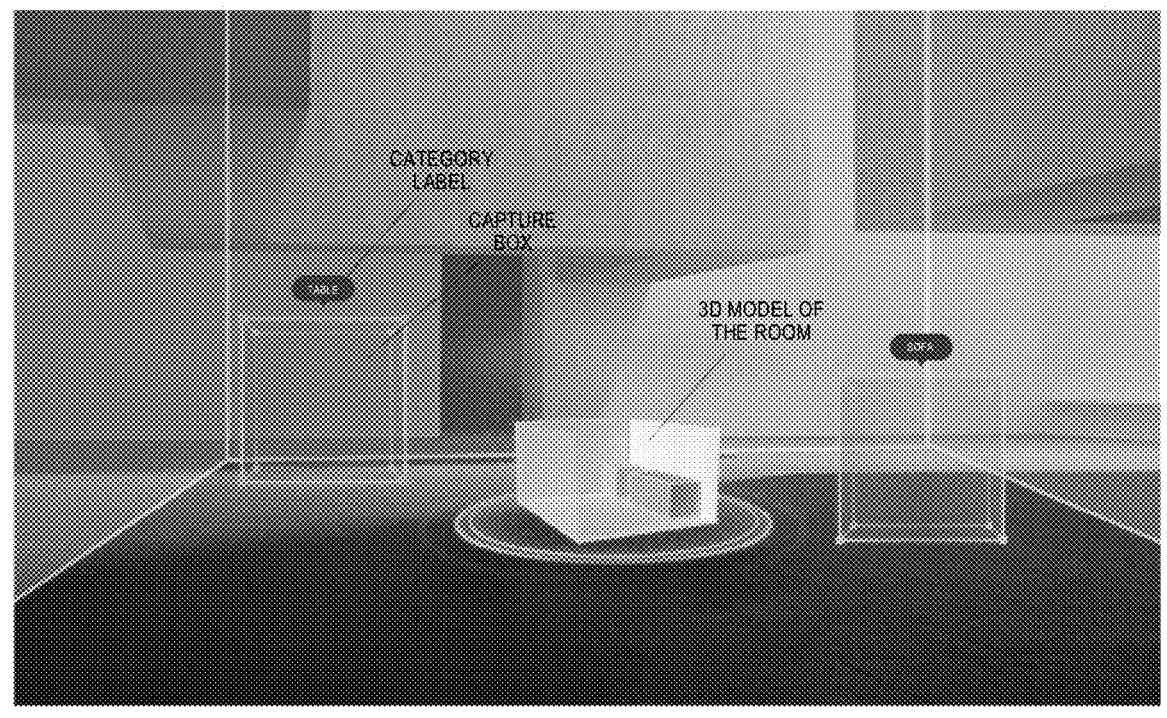
FIG. 4 is another schematic diagram of an extended reality space in a capture process.

FIG. 4 is another schematic diagram of an extended reality space in a capture process. As shown in FIG. 4, a category label of an object is displayed above a capture box of a captured object.

Optionally, the user may modify category information of the captured object, and when the user finds that the category of the identified object is wrong, for example, the capture model identifies a sofa as a table, then the user may modify the category of the object in real time.

Exemplarily, in response to a first operation on the capture box of the first captured object or the category information of the first captured object, an editing control and a deleting control are displayed. In response to an operation on the editing control, the category information of the first captured object is modified. Alternatively, in response to an operation on the deleting control, the capture information of the first captured object, the 3D model and the capture box are deleted.

The first captured object is any object already captured in a room, and the first operation may be a hover operation, a long press operation, a double click operation, or the like.

Figure 5:
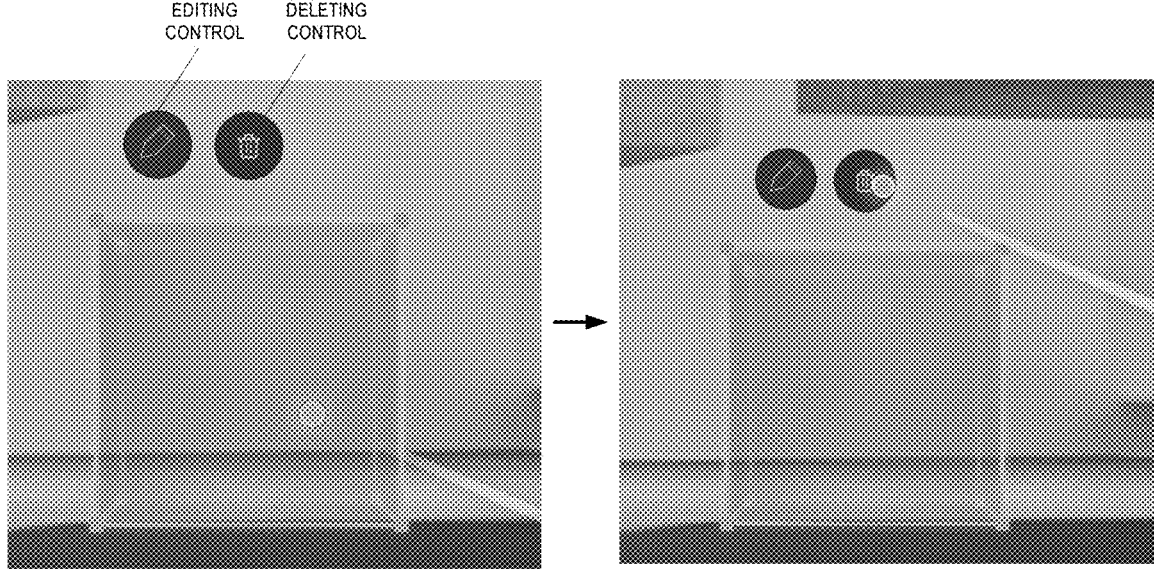
FIG. 5 is a schematic diagram of an extended reality space in a capture result modification process of a captured object.

FIG. 5 is a schematic diagram of an extended reality space in a capture result modification process of a captured object. As shown in FIG. 5, a user controls a cursor of an interactive ray to hover on a capture box of a first captured object, and then displays an editing control and a deleting control above the capture box of the first captured object. After the user controls the cursor to move to the deleting control and then performs a click operation, capture information of the first captured object is deleted, and after the capture information of the first captured object is deleted, the capture box and the 3D model of the first captured object displayed in the 3D space are also deleted.

If the user controls the cursor to move to the editing control and then performs a click operation, the deleting control is hidden, and a category list of the object is expanded at the same time. The category list includes a plurality of category names, and the user may select a correct category name to complete the modification of the category information of the first captured object. By modifying the category information of the object in the 3D space, the method is more convenient and intuitive.

Optionally, the capture box of the captured object further has a texture, and the user may also modify the color and/or texture of the capture box of the captured object. If the capture box of the captured object has no texture, the user may also add a texture to the capture box of the captured object according to his/her own demand. The user modifies the color and texture of the captured object in the 3D space, or adds texture information, which is more convenient and intuitive.

Optionally, a model display area is set in the VST image, and a 3D model of the room is displayed in the model display area. The model display area is located at a pre-determined position in the field of view of the user. For example, the model display area is located at a position that is 1 m away from the user and 0.5 m away from the height of the ground. Referring to FIG. 3 and FIG. 4, a region formed by a plurality of concentric circles in the figure is the model display area.

The 3D model of the room has a position and a pose, and the pose of the 3D model of the room may be understood as a perspective of the 3D model of the room or an angle of the 3D model of the room. Optionally, the position and/or the pose of the 3D model of the room may be transformed.

In an implementation, the position of the 3D model of the room is fixed in the field of view of the user. For example, the position of the 3D model of the room is fixed at a center position of the field of view of the user. In another implementation, the position of the 3D model of the room may move in the field of view of the user. When it is detected that a rotation angle of the head mount device is greater than a pre-determined angle or the 3D model of the room moves out of the field of view of the user, the 3D model of the room is controlled to move to a pre-determined position in the field of view of the user according to the position of the head mount device. When the 3D model of the room moves out of the field of view of the user, the 3D model of the room is controlled to move to the pre-determined position in the field of view of the user according to the position of the head mount device, or it can also be understood as the 3D model of the room or the model display area are beyond a follow-up head of the field of view.

The field of view of the user is also the field of view of the head mount device, the 3D model of the room is located at a fixed position of the model display area, and the position of the 3D model of the room moves in the field of view of the user.

The 3D model of the room may rotate within the field of view of the user, i.e., the pose of the 3D model of the room is varied. In an implementation, the 3D model of the room may rotate in both the horizontal direction and the vertical direction. In another implementation, the 3D model of the room rotates only in the horizontal direction and does not rotate in the vertical direction. Correspondingly, based on that a rotation of the head mount device in a horizontal direction is detected, the 3D model of the room follows the head mount device to rotate in the horizontal direction, and based on that a rotation of the head mount device in a vertical direction is detected, the 3D model of the room does not rotate.

In the later implementation, a rotation angle of the 3D model of the room in the horizontal direction may be the same as or different from a rotation angle of the head mount device in the horizontal direction.

Exemplarily, when the 3D model of the room rotates only in the horizontal direction and does not rotate in the vertical direction, assuming that the head mount device rotates to the left in the horizontal direction, the 3D model of the room also rotates to the left in the horizontal direction, and for the user, the 3D model of the room always faces the user.

In the automatic capture process of the embodiment, the user only needs to wear the head mount device to move in the room to capture the object in the room, and display the capture result and the capture progress to the user in real time. In the above capture process, similar to a scanning process, the room is scanned through the camera, and the scanning result (the capture box and the 3D model of the object) is displayed to the user.

In a method of the embodiment, an RGB image of a room to be captured, depth information of the RGB image, and camera pose information are acquired and input into a capture model to obtain capture information of an object in the RGB image, and the capture information of the object comprises a category of the object and position information of the object. A capture box of the object is displayed in a VST image of the room according to the capture information of the object, a 3D model of the object is added in a 3D model of the room, and the 3D model of the room is generated according to a pre-determined size ratio for the captured object in the room. According to the method, a capture of the room can be automatically accomplished according to images acquired by a camera, the capture efficiency and accuracy are improved, and in the capture process, the 3D model of the captured object can be generated and displayed in real time according to the capture information of the object, so that the user can know the capture progress of the room, thus bringing a better capture experience to the user.

Figure 6:
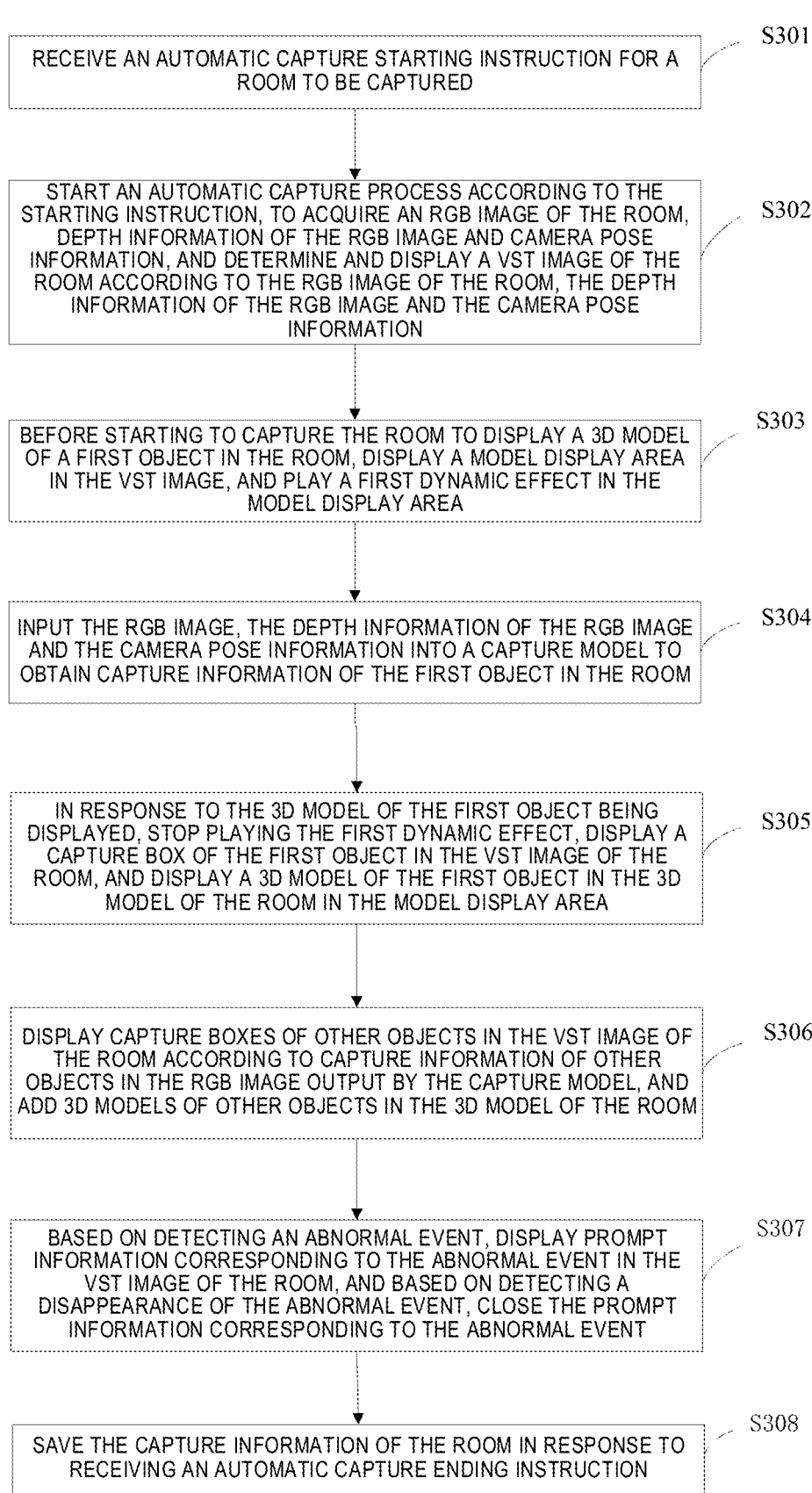
FIG. 6 is a flowchart of a full-automatic capture method for a room according to an embodiment 2 of the present application.

Based on the embodiment 1, embodiment 2 of the present application provides a full-automatic capture method for a room. FIG. 6 is a flowchart of a full-automatic capture method for a room according to an embodiment 2 of the present application.

At S301, an automatic capture starting instruction of a room to be captured is received.

The automatic capture starting instruction may be input by a user or automatically generated by an XR device. For example, after the user selects an automatic capture mode, the XR device generates the automatic capture starting instruction.

At S302, an automatic capture process is started according to the starting instruction, to acquire an RGB image of the room, depth information of the RGB image, and camera pose information, and a VST image of the room is generated and displayed according to the RGB image of the room, the depth information of the RGB image, and the camera pose information.

After receiving the starting instruction, the XR device starts the automatic capture process, takes the RGB image of the room through a camera, acquires depth information of the RGB image and pose information of the camera, generates a VST image of the room according to the RGB image, the depth information of the RGB image and the camera pose information, and displays the VST image of the room.

At S303, before starting to capture the room to display a 3D model of the first object in the room, a model display area is displayed in the VST image, and a first dynamic effect is played in the model display area.

It can be understood that the capture of the object in the room requires a certain time, and before the 3D model of a first object in the room is started to be displayed, there is no 3D model of the object in the model display area. Playing the first dynamic effect is an optional operation.

Optionally, before starting to capture the room to display the 3D model of the first object in the room, first prompt information is further displayed in the VST image, wherein the first prompt information is used to prompt the user to walk in the room. Exemplarily, the first prompt information is "please walk to observe the environment of the room".

Optionally, the first prompt information may be located in a center position of the field of view of the user and move along with movement of the head mount device.

Figure 7:
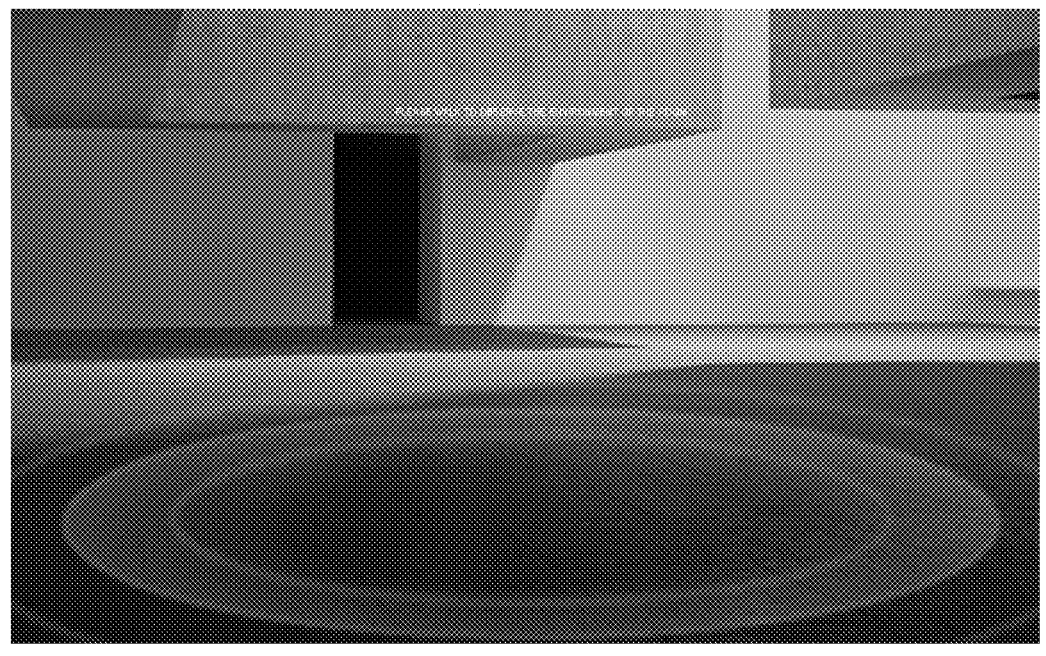
FIG. 7 is a schematic diagram of an extended reality space before starting to capture a room to display a 3D model of a first object in the room.

FIG. 7 is a schematic diagram of an extended reality space before starting to capture the room to display the 3D model of the first object in the room. As shown in FIG. 7, the prompt information "please walk to observe the environment of the room" is displayed in the center of the field of view of the user, and the first dynamic effect is played in the model display area. Exemplarily, the first dynamic effect is a dynamic process of spreading water ripples from inside to outside.

At S304, the RGB image, the depth information of the RGB image, and the camera pose information are inputted into a capture model to obtain capture information of the first object in the room.

The process of determining the capture information of the first object and the process of generating the VST image in the step S302 may be performed synchronously, or may have a chronological order.

At S305, based on the 3D model of the first object being displayed, playing the first dynamic effect is stopped, a capture box of the first object is displayed in the VST image of the room, and a 3D model of the first object in the 3D model of the room is displayed in the model display area.

In the embodiment, when the 3D model of the first object in the room is identified, playing the first dynamic effect is stopped. Optionally, in other embodiments, when the 3D model of the object is identified, playing the first dynamic effect may also be continued. After the first object in the room is identified and the 3D model of the first object is displayed, a display effect of the 3D space is shown in FIG. 3.

At S306, capture boxes of other objects are displayed in the VST image of the room according to capture information of other objects in the RGB image output by the capture model, and 3D models of other objects are added in the 3D model of the room.

For a specific implementation of this step, reference is made to the description of the embodiment 1, and details are not described herein again.

At S307, in response to detecting an abnormal event, prompt information corresponding to the abnormal event is displayed in the VST image of the room, and in response to detecting a disappearance of the abnormal event, the prompt information corresponding to the abnormal event is closed.

Optionally, in the automatic capture process, some abnormal events may occur, and an abnormal prompt is triggered. Exemplarily, the following abnormal events may be detected in the embodiment of the present application, and the abnormal prompt is provided.

Abnormal event 1: the user does not move in a pre-determined duration (for example, 5 seconds), or the 3D model of the object is not generated.

The prompt information 1 corresponding to the abnormal event 1 is used to prompt the user to walk in the room.

Exemplarily, the prompt information 1 is "please walk to observe the room, see the ground, the wall, the ceiling and the furniture".

A disappearance condition of the prompt information 1 corresponding to the abnormal event 1 is that it is to be disappeared once the user moves and the scanning result is updated. Herein, the scanning result refers to the capture box and the 3D model of the object.

Abnormal event 2: the moving speed of the user is greater than or equal to a pre-determined speed. The moving speed of the user refers to the moving speed of the head mount device. The head mount device may detect its own moving speed, and when the moving speed of the user is too fast, it is not possible to take a clear RGB, thus leading to being unable to identify the object.

Prompt information 2 corresponding to the abnormal event 2 is used to prompt the user that the moving speed is too fast. Exemplarily, the prompt information 2 is "please move slowly".

A disappearance condition of the prompt information 2 corresponding to the abnormal event 2 is that the moving speed of the user is less than the pre-determined speed.

Abnormal event 3: a wall surface is detected, but a first distance between the wall surface and the user is greater than or equal to a first pre-determined distance. The first distance between the wall surface and the user may be obtained by using the depth information of the RGB image, or may be obtained by other distance measurement methods, for example, by using a TOF sensor. When the first distance between the wall surface and the user is greater than or equal to the first pre-determined distance, it indicates that the user is far away from a wall surface. Exemplarily, the first pre-determined distance is 5 meters (m), and when the first distance is greater than 5 m, the user needs to prompt the user to approach the wall surface because the distance is too far to detect category of object in the space.

Prompt information 3 corresponding to the abnormal event 3 indicates that the user is too far away from a wall. Exemplarily, the prompt information 3 is "please close to the wall".

A disappearance condition of the prompt information 3 corresponding to the abnormal event 3 is detecting that the first distance between the wall surface and the user is less than the first pre-determined distance.

Abnormal event 4: it is detected that a second distance between the object and the user is less than a second pre-determined distance. The way of detecting the second distance refers to the way of detecting the first distance, and the second pre-determined distance is less than the first pre-determined distance. Exemplarily, the second pre-determined distance is 50 centimeters (cm). When the second distance is less than 50 cm, the camera may capture only a part of the object (for example, a corner of the table), so that the category of the object cannot be accurately detected, or the detected category of the object is inaccurate.

Prompt information 4 corresponding to the abnormal event 4 is used to prompt the user that the object is too close to the object. Exemplarily, the prompt information 4 is "please keep far away from a wall/object".

A disappearance condition of the prompt information 4 corresponding to the abnormal event 4 is: the second distance between the object and the user is greater than a third pre-determined distance, which is greater than the second pre-determined distance and less than the first pre-determined distance. Exemplarily, the third pre-determined distance is 1 m.

Abnormal event 5: an illumination intensity in the room is less than a first pre-determined intensity. When the illumination intensity in the room is less than the first pre-determined intensity, it indicates that the room is too dark, and at this time, the brightness of the captured RGB image is relatively low, which may cause the category of the object to be unable to be identified, or the position of the object cannot be determined, or the category of the identified object is wrong.

Prompt information 5 corresponding to the abnormal event 5 is used to prompt that an ambient light of the room is too dark. Exemplarily, the prompt information 5 is "the environment is too dark, please keep illumination bright".

A disappearance condition of the prompt information 5 corresponding to the abnormal event 5 is: the illumination intensity in the room is greater than the first pre-determined intensity, or the illumination intensity in the room is greater than the second pre-determined intensity, and the second pre-determined intensity is greater than the first pre-determined intensity.

Figure 8:
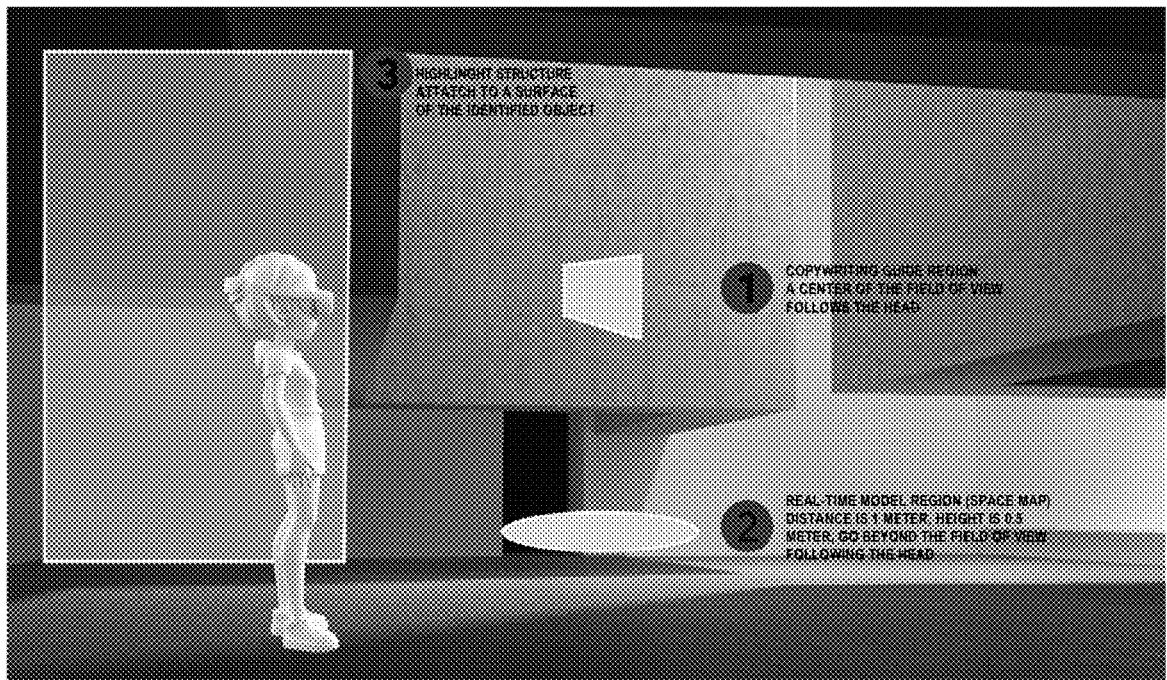
FIG. 8 is a schematic diagram of display positions of various virtual objects in an extended reality space in a capture process.

In the embodiment, the prompt information corresponding to the abnormal events may be displayed in a central position of the field of view. As shown in FIG. 8, FIG. 8 is a schematic diagram of display positions of various virtual objects in an extended reality space in a capture process. In the embodiment of the present application, the virtual objects superimposed and displayed in the VST image of the room include but are not limited to the following three types: a capture box of the object, a 3D model of the room, or prompt information.

Various prompt information is displayed at a position 1 shown in FIG. 8 (that is, a copywriting guide region shown at the number 1 in the figure). The copywriting guide region is located at the center of the field of view and follows the head in real time. Following the head in real time refers to that the copywriting guide region follows the movement of the head mount device. The prompt information includes, but is not limited to, text and/or image information, and the image information may be an icon or an information prompt panel or an interactive panel of 2D.

The 3D model of the room is displayed at a position 2 shown in FIG. 8 (i.e., a real-time model region shown at the number 2 in the figure), wherein the real-time model region is the model display area described above. The 3D model of the room is also referred to as a space map, and the position of the real-time model region in FIG. 8 is "distance is 1 meter, height is 0.5 meter, and follows the head beyond the field of view".

The capture box of the object is displayed at a position 3 shown in FIG. 8 (that is, the real-time model region shown at the number 3 in the figure). It can be understood that the position 3 shown in FIG. 8 is merely an example, the position of the capture box of the object is consistent with the position of the object, and FIG. 8 is only to illustrate the display requirement of the capture box of the object: being attach to a surface of the identified object.

At S308, the capture information of the room is saved in response to receiving an automatic capture ending instruction.

Exemplarily, when an end operation is detected, a "End Automatic Capture" control and a "Reset" control are displayed in the VST image. As shown in FIG. 9, FIG. 9 is a schematic diagram of a display of an extended reality space after receiving an automatic capture ending instruction. When the user clicks the "End Automatic Capture" control, the automatic capture ending instruction is generated and the capture information of the room is saved. When the user clicks the "reset" control, the full-automatic capture process of the room is restarted.

Optionally, the "End Automatic Capture" control has two display states: a concealed state and a clickable state. The default setting is the concealed state. When a control is in the concealed state, it is not clickable, and it is changed to the clickable state when the following conditions are met: the capture of the ground and two walls are accomplished, and a length of the one wall is greater than a pre-determined length (for example, 2 m). The "reset" control has only one state: the clickable state.

Optionally, the end operation is a 3D model of the user looking down to the ground or the cursor hovers to the room.

In an implementation, after receiving the automatic capture ending instruction and saving the capture result of the room, the capture process ends. In another implementation, an adjustment mode is entered after the capture result of the room is saved. After entering the adjustment mode, the user may adjust the capture result of the room, and a specific adjustment process is described with reference to the following embodiment 3.

In the automatic capture process, a situation where the MR application exits abnormally may also occur, for example, being shut down due to low power or the program is closed abnormally. At this time, the user does not click the "End Automatic Capture". For another example, the 6Dof is restarted. In case of these abnormal exits, the XR device does not store the capture result of the room, and after the MR application is again entered, the automatic capture process is restarted.

In the embodiment, before starting to capture the room to display the 3D model of the first object in the room, the first dynamic effect is played in the model display area so as to facilitates the user to know the capture process, thus bringing a better experience to the user. In the automatic capture process, in response to detecting an abnormal event, prompt information corresponding to the abnormal event is displayed in the VST image. In response to detecting a disappearance of the abnormal event, the prompt information corresponding to the abnormal event is closed, the user can be reminded in time that an abnormality occurs, and the problem that the user cannot capture due to improper operation or inaccurate capture result is avoided.

Based on the embodiment 1 and the embodiment 2, embodiment 3 of the present application provides a full-automatic capture method for a room. FIG. 10 is a flowchart of a full-automatic capture method for a room according to an embodiment 3 of the present application, and the embodiment is configured to adjust a capture result of the room after automatic capture is finished. As shown in FIG. 10, the method provided in the embodiment includes the following steps.

At S401, capture information of the room is saved and an adjustment mode is entered, in response to receiving an automatic capture ending instruction.

At S402, after entering the adjustment mode, a 3D model of the room is controlled to be switched to a pre-determined state, and a manual capture control and a creating completion control are displayed in the VST image.

Optionally, controlling the 3D model of the room to be switched to the pre-determined state comprises: amplifying the 3D model to a pre-determined size; and/or adjusting a display position of the 3D model of the room. The adjusting a display position of the 3D model of the room comprises adjusting a display height of the 3D model of the room to a pre-determined height, for example, adjusting the display height of the 3D model of the room from 0.5 m to 0.8 m.

Figure 11:
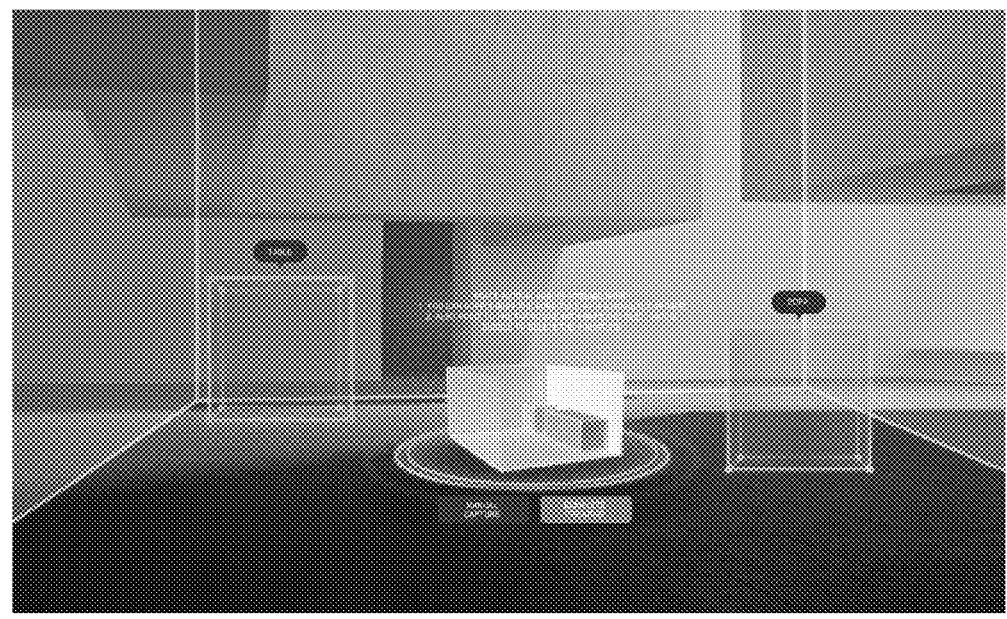
FIG. 11 is a schematic diagram of a display of an extended reality space after entering an adjustment mode.

FIG. 11 is a schematic diagram of a display of an extended reality space after entering an adjustment mode. As shown in FIG. 11, a 3D model with a pre-determined state, a manual capture control, a creating completion control, capture boxes of some objects, and prompt information are displayed in a VST image.

The manual capture control is used to trigger a manual capture process, and a user can manually capture some unidentified objects under the manual capture process. The creating completion control is used to confirm that the adjustment process of the capture information of the room ends, and after the user clicks the creating completion control, the capture information of the room is saved, and the adjustment process ends.

If category information of the captured object is not displayed in the capture process and/or the capture box of the captured object is not filled with the color, after entering the adjustment mode, a following adding operation may be further performed: displaying the category information of the captured object at a pre-determined position of the capture box of the captured object; and/or filling the capture box of the captured object with the color according to the category information of the captured object, the adding operation being perceptible to the user.

If the category information of the captured object has been displayed in the capture process, and the capture box of the captured object is filled with the color in the capture process, the adding operation is not required to be performed.

Optionally, after entering the adjustment mode, the user may modify the category information of the captured object, or may select to delete the capture information of a certain object. Correspondingly, the method may further comprise the following steps: displaying an editing control and a deleting control in response to a first operation on the capture box of the first captured object or the category information of the first captured object; modifying the category information of the first captured object in response to an operation on the editing control; or deleting the capture information of the first captured object, the 3D model and the capture box in response to an operation on the deleting control.

The specific implementation of the modification operation on the category information of the captured object and the deleting operation on the capture information of the captured object in the adjustment mode is similar to the modification operation on the category information of the captured object and the deleting operation on the capture information of the captured object in the capture process, and details are not described herein again, and refer to the related description of the embodiment 1.

Optionally, after entering the adjustment mode, the user may rotate the 3D model of the room. Exemplarily, in response to detecting a second operation on the 3D model of the room, the 3D model of the room is controlled to enter an editing state. After the 3D model of the room enters the editing state, the 3D model of the room displays a pre-determined special effect, and in response to detecting the rotation instruction, the 3D model of the room is controlled to rotate.

The pre-determined special effect is, for example, that the bottom of the 3D model of the room is highlighted, or the bottom of the 3D model of the room is displayed with water ripples extending from inside to outside.

A rotation instruction is used to control the 3D model of the room to rotate, and the rotation instruction can control the 3D model of the room to rotate in a horizontal direction and/or a vertical direction. For example, the second operation may be a hover operation on the 3D model of the room, the rotation instruction is a pressing operation on a trigger key, and the user may press the trigger key to turn the 3D model of the room around in the horizontal direction to view the 3D model of the room.

It should be noted that, in the automatic capture process, the user may also control the rotation of the 3D model of the room through the second operation and the rotation instruction.

At S403, a pre-determined operation is performed in response to an operation on the manual capture control, the pre-determined operation including displaying a manual capture panel, and a type selection control of an object to be added is displayed on the manual capture panel.

After receiving a click operation on the manual capture control, the manual capture process is entered, in which the pre-determined operation is performed first, the pre-determined operation comprises displaying the manual capture panel in the VST image, and the type selection control of the object to be added is displayed on the manual capture panel.

Optionally, the pre-determined operation comprises: hiding the 3D model of the room and/or hiding the category information of the captured object. By hiding the 3D model of the room and/or the category information of the captured object, the 3D model of the room and/or the category of the captured object are prevented from occlusion of uncaptured objects in the room, and manual a capture of the user is affected.

Figure 12:
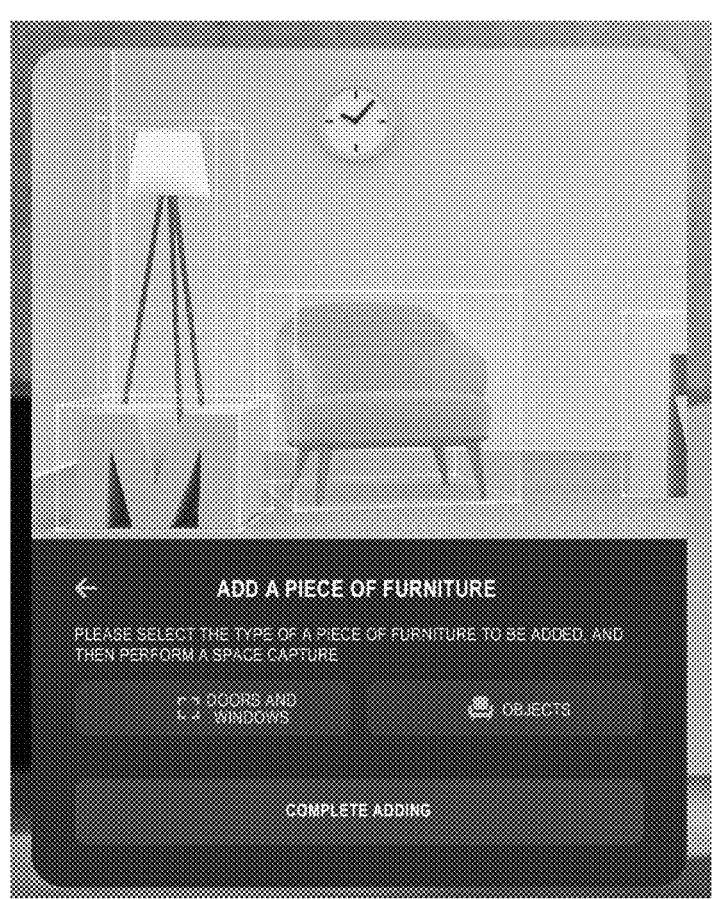
FIG. 12 is a schematic diagram of a manual capture panel.

FIG. 12 is a schematic diagram of a manual capture panel. As shown in FIG. 12, a title of the manual capture panel is "Add a piece of furniture", the type selection control of the object to be added is displayed on the manual capture panel, that is, "doors and windows" and "objects" in the figure, wherein the "doors and windows" refer to an object type whose capture box is a rectangular box, usually a floor, a ceiling, a wall, a door, a window and the like, and the "objects" is an object type whose capture box is a cuboid, for example, pieces of furniture, home appliances, and the like in the room.

The manual capture panel may be located at the center of the field of view and the field of view follows the head. The manual capture panel further includes a "Return" control (i.e., an arrow in the figure) and a "Complete addition" control.

At S404, in response to a selection operation on the type selection control, a manual capture mode is entered, and the object to be added is captured in the manual capture mode.

Exemplarily, when the selection operation on the type selection control is received, the manual capture panel is hidden, the capture prompt panel is displayed, and the manually captured demonstration video is played in the capture prompt panel, and a capture of the object to be added is accomplished according to a capture operation of a user.

The demonstration video is used for displaying manually captured operations and considerations to the user. The capture prompt panel can be hidden after the demonstration video is played for a pre-determined number of times or a pre-determined duration, or the capture prompt panel can be manually closed by the user.

Figure 13:
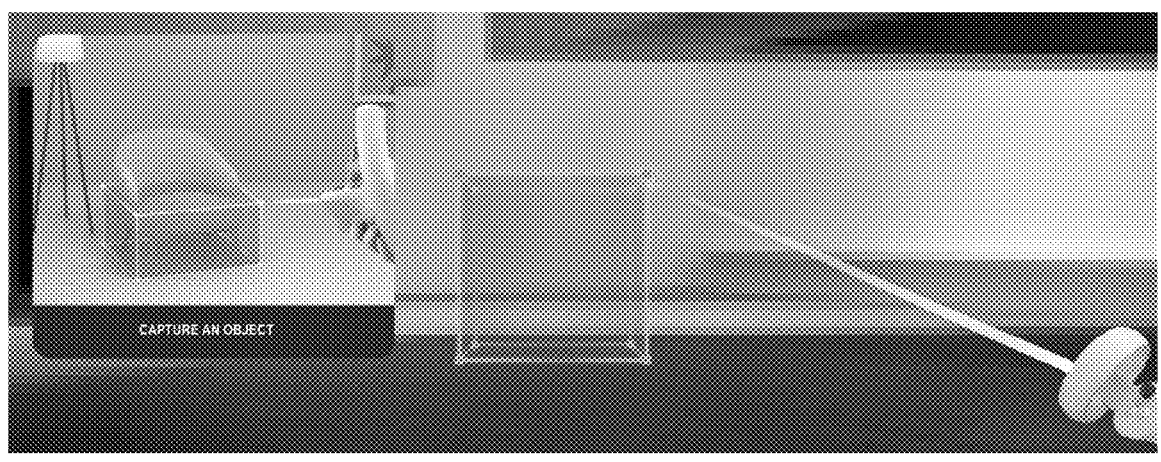
FIG. 13 is a schematic diagram of a display of an extended reality space after entering a manual capture mode.

FIG. 13 is a schematic diagram of a display of an extended reality space after entering a manual capture mode. As shown in FIG. 13, a panel in the upper left corner is a capture prompt panel, and the user controls a virtual handle to capture an object to be added in the room.

After the capture of the object to be added is accomplished, the manual capture panel is displayed, the user may select to continue to add an object for manual capture, or the "Add" control may be clicked and returned to the previous layer, that is, to an initial state of the adjustment mode.

In the embodiment of the present application, exporting a capture result of the room is also supported, and the capture result of the room includes category information, size, position information, and the like of each identified object in the room. After the capture result of the room is exported to a specific tool, the category information, the size, the position information and the like of the object may be adjusted, and the capture result of the room may be output to an upper-layer application.

In the method of the embodiment, after the automatic capture is accomplished, the adjustment mode may be entered. The user may add missed uncaptured objects through the manual capture mode in the adjustment mode, and the capture information of the captured object may be modified. For example, the captured object is deleted, or the category information of the captured object is modified, or objects with inaccurate capture are deleted, and then re-captured manually. By providing the adjustment mode for the user to adjust the capture result of the room, a satisfactory capture result can be obtained, thus bringing a better experience to the user.

Figure 14:
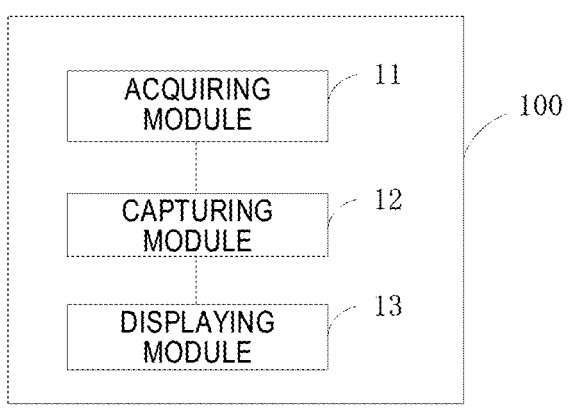
FIG. 14 is a schematic diagram of a structure of a full-automatic capture apparatus for a room according to an embodiment 4 of the present application.

In order to better implement a full-automatic capture method for a room according to an embodiment of the present application, the embodiment of the present application further provides a full-automatic capture apparatus for a room. FIG. 14 is a schematic diagram of a structure of a full-automatic capture apparatus for a room according to an embodiment 4 of the present application. As show in FIG. 14, The full-automatic capture apparatus 100 for a room may comprise: an acquiring module 11 configured to acquire a red-green-blue (RGB) image of a room to be captured, depth information of the RGB image, and camera pose information; a capturing module 12 configured to input the RGB image, the depth information of the RGB image, and the camera pose information into a capture model to obtain capture information of an object in the RGB image, wherein the capture information of the object comprises a category of the object and position information of the object; and a displaying module 13 configured to display a capture box of the object in a video see-through, VST, image of the room according to the capture information of the object, and add a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

In some embodiments, category information of the captured object is displayed at a pre-determined position of the capture box of the captured object.

In some embodiments, a color of the capture box of the captured object and a color of the 3D model of the captured object are associated with the category of the captured object, and the color of the capture box of the captured object is the same as the color of the 3D model of the captured object.

In some embodiments, a model display area is arranged in the VST image, and the 3D model of the room is displayed in the model display area.

In some embodiments, the displaying module 13 is further configured to: play a first dynamic effect in the model display area before starting to capture the room to display a 3D model of a first object in the room; and stop playing the first dynamic effect based on the 3D model of the first object being displayed.

In some embodiments, the displaying module 13 is specifically configured to: sequentially display, on a surface of the object displayed in the VST image and according to the position information of the object, the capture box of the object formed by capture lines; determine a position and a size of the 3D model of the object according to the position information of the object; and grow the 3D model of the object in the 3D model of the room based on a pre-determined growth rule according to the position and the size of the 3D model of the object, wherein the growth rule comprises a growth direction.

In some embodiments, the apparatus further comprises: an adjustment module configured to, in response to receiving an automatic capture ending instruction, save the capture information of the room and enter an adjustment mode.

After entering the adjustment mode, the 3D model of the room is controlled to be switched to a pre-determined state, and a manual capture control and a creating completion control are displayed in the VST image, wherein the manual capture control is used to trigger a manual capture process, and the creating completion control is used to confirm an end of an adjustment process of the capture information of the room.

In some embodiments, the controlling the 3D model of the room to be switched to a pre-determined state comprises: amplifying the 3D model to a pre-determined size; and/or adjusting a display position of the 3D model of the room.

In some embodiments, if category information of the captured object is not displayed in the capture process and/or the capture box of the captured object is not filled with a color, after entering the adjustment mode, the method further comprises: displaying the category information of the captured object at a pre-determined position of the capture box of the captured object; and/or filling the capture box of the captured object with the color according to the category information of the captured object.

In some embodiments, the apparatus further comprises an editing module configured to: display an editing control and a deleting control in response to a first operation on the capture box of the first captured object or the category information of the first captured object; modify the category information of the first captured object in response to an operation on the editing control; or delete the capture information, the 3D model and the capture box of the first captured object in response to an operation on the deleting control.

In some embodiments, the apparatus further comprises a manual capturing module configured to: perform a pre-determined operation in response to an operation on the manual capture control, wherein the pre-determined operation comprises displaying a manual capture panel, and a type selection control of an object to be added is displayed on the manual capture panel; and in response to a selection operation on the type selection control, enter a manual capture mode, and capture the object to be added in the manual capture mode.

In some embodiments, the pre-determined operation further comprises hiding the 3D model of the room and/or hiding the category information of the captured object.

The capturing the object to be added in the manual capture mode comprises:

hiding the manual capture panel; displaying a capture prompt panel, in which a manually captured presentation video is played; and accomplishing a capture of the object to be added according to a capture operation of a user.

In some embodiments, the apparatus further comprises a model rotation module configured to: in response to detecting a second operation on the 3D model of the room, control the 3D model of the room to enter an editing state, and display a pre-determined special effect on the 3D model of the room after the 3D model of the room enters the editing state; and control the 3D model of the room to rotate in response to detecting a rotation instruction.

In some embodiments, the 3D model of the room is movable in a field of view of a user, and the apparatus further comprises a first control module configured to: in accordance with a determination that a rotation angle of a head mount device is greater than a pre-determined angle or the 3D model of the room moves out of the field of view of the user, control the 3D model of the room to move to a pre-determined position in the field of view of the user according to a position of the head mount device.

In some embodiments, the 3D model of the room is rotatable in the field of view of the user, and the method further comprises a second control module configured to: based on that a rotation of the head mount device in a horizontal direction is detected, the 3D model of the room follows the head mount device to rotate in the horizontal direction, and based on that a rotation of the head mount device in a vertical direction is detected, the 3D model of the room does not rotate.

In some embodiments, the capture model comprises a room layout model and a 3D object detection model.

The room layout model is used for detecting walls, floors, ceilings, and doors and windows in the room.

The 3D object detection model is used for detecting pieces of furniture in the room.

In some embodiments, the apparatus further comprises an abnormality processing module configured to: display prompt information corresponding to an abnormal event in the VST image in response to detecting the abnormal event; and close the prompt information corresponding to the abnormal event in response to detecting a disappearance of the abnormal event.

The prompt information corresponding to the abnormal event is used to prompt the following: a movement of a user in a room, the user being moving too fast, a distance between the user and a wall being too far, the user being too close to the object, or an ambient light of the room is too dark.

It should be understood that the apparatus embodiment and the method embodiment may correspond to each other, and similar description may refer to the method embodiment. To avoid repetition, details are not described herein again.

The apparatus 100 in the embodiments of the present application is described above from the perspective of functional modules in conjunction with the accompanying drawings. It should be understood that the functional modules may be implemented in hardware, or may be implemented by using instructions in the form of software, or may also be implemented by a combination of hardware and software modules. Specifically, steps in the method embodiment in the embodiments of the present application may be accomplished by using an integrated logic circuit of hardware in a processor and/or the instructions in the form of software, and steps of the method disclosed in the embodiments of the present application may be directly embodied as execution of a hardware decoding processor, or performed by combining hardware and software modules in the decoding processor. Optionally, the software modules may be located in a mature storage medium in the art such as a random access memory, a flash memory, a read-only memory, a programmable read-only memory, an electrically erasable programmable memory, a register, and the like. The storage medium is located in a memory, the processor reads information in the memory, and accomplishes the steps in the foregoing method embodiment in combination with its hardware.

Figure 15:
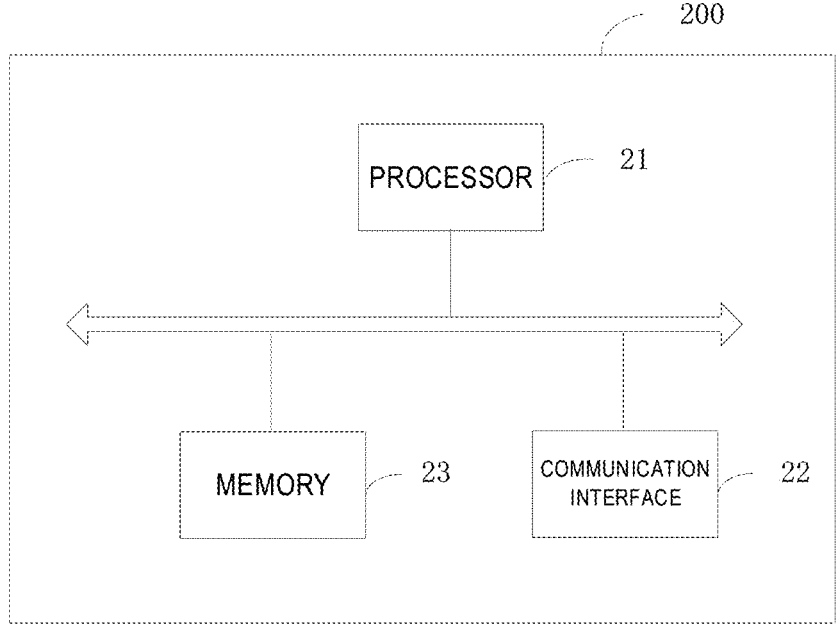
FIG. 15 is a schematic diagram of a structure of an XR device according to an embodiment 5 of the present application.

An embodiment of the present application further provides an XR device. FIG. 15 is a schematic diagram of a structure of an XR device according to an embodiment 5 of the present application. As shown in FIG. 15, the XR device 200 may comprise:

A memory 21 and a processor 22. The memory 21 is configured to store a computer program, and transmit program codes to the processor 22. In other words, the processor 22 may invoke and run the computer program from the memory 21 to implement the method in the embodiments of the present application.

For example, the processor 22 may be configured to perform the foregoing method embodiment according to instructions in the computer program.

In some embodiments of the present application, the processor 22 may include, but is not limited to: a general-purpose processor, a Digital Signal Processor (DSP), an Application Specific Integrated Circuit (ASIC), a Field Programmable Gate Array (FPGA), other programmable logic device, a discrete gate or transistor logic device, a discrete hardware component, and so on.

In some embodiments of the present application, the memory 21 includes, but is not limited to: a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which serves as an external cache. By way of example and not limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM).

In some embodiments of the present application, the computer program may be divided into one or more modules, which are stored in the memory 21 and executed by the processor 22 to complete the method provided in the present application. The one or more modules may be a series of computer program instruction segments capable of completing specific functions, and the instruction segments are used to describe an execution process of the computer program in the XR device.

As shown in FIG. 15, the XR device may further include a transceiver 23, which may be connected to the processor 22 or the memory 21.

The processor 22 may control the transceiver 23 to communicate with other devices, specifically, may send information or data to the other devices, or receive information or data sent by the other devices. The transceiver 23 may include a transmitter and a receiver. The transceiver 23 may further include an antenna, and there may be one or more antennas.

It can be understood that although not shown in FIG. 15, the XR device 200 may further include a camera module, a wireless fidelity (WIFI) module, a positioning module, a Bluetooth module, a display, a controller, and the like, and details are not described herein again.

It should be understood that each component in the XR device is interconnected by a bus system, where the bus system includes, in addition to a data bus, a power bus, a control bus, and a status signal bus.

The present application further provides a computer storage medium having stored thereon a computer program, that when executed by a computer, causes the computer to perform the method in the foregoing method embodiment. In other words, an embodiment of the present application further provides a computer program product comprising instructions, that when executed by a computer, cause the computer to perform the method in the foregoing method embodiment.

The present application further provides a computer program product comprising a computer program that is stored in a computer-readable storage medium. A processor of the XR device reads the computer program from the computer-readable storage medium, and the processor executes the computer program, so that the XR device performs a corresponding process in the method for controlling the position of the user in the virtual scene in the embodiments of the present application. For brevity, details are not described herein again.

In the several embodiments provided in the present application, it should be understood that the disclosed systems, apparatuses, and methods may be implemented in other manners. For example, the apparatus embodiment described above are merely illustrative. For example, the division of the modules is merely a logical function division, and in actual implementations, there may be another division manner. For example, multiple modules or components may be combined or may be integrated into another system, or some features may be ignored, or not executed. Alternatively, the mutual coupling or direct coupling or communication connections shown or discussed may be an indirect coupling or communication connections through some interfaces, apparatuses, or modules, and may be in electrical, mechanical, or other forms.

The modules described as separate components may or may not be physically separate, and the components displayed as modules may or may not be physical modules, that is, may be located in one place, or may be distributed on multiple network units. Some or all of the modules may be selected according to actual needs to achieve the purpose of the solution of the embodiment. For example, each functional module in the embodiments of the present application may be integrated into one processing module, or may be separately physically present by each module, or two or more modules may be integrated in one module.

The foregoing is only specific embodiments of the present application, but the scope of protection of the present application is not limited thereto. Any one of ordinary skill in the art may easily contemplate variations or replacements within the technical scope of the present application, and these variations or replacements should be included within the scope of protection of the present application. Therefore, the scope of protection of the present application should be based on the scope of protection of the claims.

What is claimed is:

1. A full-automatic capture method for a room, comprising:

acquiring a red-green-blue, RGB, image of a room to be captured, depth information of the RGB image and camera pose information;

inputting the RGB image, the depth information of the RGB image and the camera pose information into a capture model to obtain capture information of an object in the RGB image, wherein the capture information of the object comprises a category of the object and position information of the object;

displaying a capture box of the object in a video see-through, VST, image of the room according to the capture information of the object, and adding a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

2. The method of claim 1, wherein category information of the captured object is displayed at a pre-determined position of the capture box of the captured object.

3. The method of claim 2, wherein a color of the capture box of the captured object and a color of the 3D model of the captured object are associated with the category of the captured object, and the color of the capture box of the captured object is the same as the color of the 3D model of the captured object.

4. The method of claim 1, wherein a model display area is arranged in the VST image, and the 3D model of the room is displayed in the model display area.

5. The method of claim 4, further comprising:

playing a first dynamic effect in the model display area before starting to capture the room to display a 3D model of a first object in the room; and stopping playing the first dynamic effect based on the 3D model of the first object being displayed.

6. The method of claim 1, wherein displaying a capture box of the object in a video see-through, VST, image of the room according to the capture information of the object, and adding the three-dimensional, 3D, model of the object in a 3D model of the room comprises:

sequentially displaying, on a surface of the object displayed in the VST image and according to the position information of the object, the capture box of the object formed by capture lines;

determining a position and a size of the 3D model of the object according to the position information of the object; and growing the 3D model of the object in the 3D model of the room based on a pre-determined growth rule according to the position and the size of the 3D model of the object, wherein the growth rule comprises a growth direction.

7. The method of claim 1, further comprising:

in response to receiving an automatic capture ending instruction, saving the capture information of the room and entering an adjustment mode; and after entering the adjustment mode, controlling the 3D model of the room to be switched to a pre-determined state, and displaying a manual capture control and a creating completion control in the VST image, wherein the manual capture control is used to trigger a manual capture process, and the creating completion control is used to confirm an end of an adjustment process of the capture information of the room.

8. The method of claim 7, wherein the controlling the 3D model of the room to be switched to the pre-determined state comprises:

amplifying the 3D model to a pre-determined size; and/or adjusting a display position of the 3D model of the room.

9. The method of claim 7, wherein if the category information of the captured object is not displayed in the capture process and/or the capture box of the captured object is not filled with a color, after entering the adjustment mode, the method further comprises:

displaying the category information of the captured object at a pre-determined position of the capture box of the captured object; and/or filling the capture box of the captured object with the color according to the category information of the captured object.

10. The method of claim 2, further comprising:

displaying an editing control and a deleting control in response to a first operation on the capture box of the first captured object or the category information of the first captured object;

modifying the category information of the first captured object in response to an operation on the editing control; or deleting the capture information, the 3D model and the capture box of the first captured object in response to an operation on the deleting control.

11. The method of claim 9, further comprising:

performing a pre-determined operation in response to an operation on the manual capture control, wherein the pre-determined operation comprises displaying a manual capture panel, and a type selection control of an object to be added is displayed on the manual capture panel; and in response to a selection operation on the type selection control, entering a manual capture mode, and capturing the object to be added in the manual capture mode.

12. The method of claim 11, wherein the pre-determined operation comprises hiding the 3D model of the room and/or hiding the category information of the captured object, the capturing the object to be added in the manual capture mode comprises:

hiding the manual capture panel;

displaying a capture prompt panel, in which a manually captured presentation video is played; and accomplishing a capture of the object to be added according to a capture operation of a user.

13. The method of claim 2, further comprising:

in response to detecting a second operation on the 3D model of the room, controlling the 3D model of the room to enter an editing state, and displaying a pre-determined special effect on the 3D model of the room after the 3D model of the room enters the editing state; and controlling the 3D model of the room to rotate in response to detecting a rotation instruction.

14. The method of claim 1, wherein the 3D model of the room is movable in a field of view of a user, and the method further comprises:

in accordance with a determination that a rotation angle of a head mount device is greater than a pre-determined angle or the 3D model of the room moves out of the field of view of the user, controlling the 3D model of the room to move to a pre-determined position in the field of view of the user according to a position of the head mount device.

15. The method of claim 1, wherein the 3D model of the room is rotatable in a field of view of a user, and the method further comprises:

based on that a rotation of a head mount device in a horizontal direction is detected, the 3D model of the room follows the head mount device to rotate in the horizontal direction, and based on that a rotation of a head mount device in a vertical direction is detected, the 3D model of the room does not rotate.

16. The method of any of claim 1, wherein the capture model comprises a room layout model and a 3D object detection model, the room layout model is used for detecting walls, floors, ceilings, and doors and windows in the room, and the 3D object detection model is used for detecting pieces of furniture in the room.

17. The method of any of claim 1, further comprising:

displaying prompt information corresponding to an abnormal event in the VST image in response to detecting the abnormal event; and closing the prompt information corresponding to the abnormal event in response to detecting a disappearance of the abnormal event, wherein the prompt information corresponding to the abnormal event is used to prompt the following: a movement of a user in a room, the user being moving too fast, a distance between the user and a wall being too far, the user being too close to the object, or an ambient light of the room is too dark.

18. An extended reality device, comprising:

a processor; and a memory storing a computer program, wherein, the computer program, when executed by the processor, causes the processor to:

acquire a red-green-blue, RGB, image of a room to be captured, depth information of the RGB image and camera pose information;

input the RGB image, the depth information of the RGB image and the camera pose information into a capture model to obtain capture information of an object in the RGB image, wherein the capture information of the object comprises a category of the object and position information of the object;

display a capture box of the object in a video see-through, VST, image of the room according to the capture information of the object, and add a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

19. The extended reality device of claim 18, wherein category information of the calibrated object is displayed at a pre-determined position of the calibration box of the calibrated object.

20. A non-transient computer-readable storage medium configured to store a computer program, wherein, the computer program, when executed by a processor, causes the processor to:

acquire a red-green-blue, RGB, image of a room to be captured, depth information of the RGB image and camera pose information;

input the RGB image, the depth information of the RGB image and the camera pose information into a capture model to obtain capture information of an object in the RGB image, wherein the capture information of the object comprises a category of the object and position information of the object;

display a capture box of the object in a video see-through, VST, image of the room according to the capture information of the object, and add a three-dimensional, 3D, model of the object in a 3D model of the room, wherein the 3D model of the room is displayed in the VST image, the 3D model of the room comprises a 3D model of the captured object in the room, and the 3D model of the room is generated according to a pre-determined size ratio for the captured object in the room.

\* \* \* \* \*